United States Patent
Fukuta et al.

(10) Patent No.: US 9,844,047 B2
(45) Date of Patent: *Dec. 12, 2017

(54) MOBILE COMMUNICATION SYSTEM THAT SUPPORTS A DUAL CONNECTIVITY MANAGEMENT

(71) Applicant: KYOCERA CORPORATION, Kyoto (JP)

(72) Inventors: Noriyoshi Fukuta, Yokohama (JP); Kugo Morita, Yokohama (JP); Chiharu Yamazaki, Ota-ku (JP); Henry Chang, San Diego, CA (US); Amit Kalhan, San Diego, CA (US); Yushi Nagasaka, Yokohama (JP); Masato Fujishiro, Yokohama (JP); Susumu Kashiwase, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,612

(22) Filed: Apr. 10, 2017

(65) Prior Publication Data

US 2017/0215185 A1 Jul. 27, 2017

Related U.S. Application Data

(63) Continuation of application No. 15/240,405, filed on Aug. 18, 2016, now Pat. No. 9,622,239, which is a (Continued)

(51) Int. Cl.
H04W 4/00 (2009.01)
H04W 72/04 (2009.01)
(Continued)

(52) U.S. Cl.
CPC ......... *H04W 72/0426* (2013.01); *H04W 8/24* (2013.01); *H04W 74/0833* (2013.01);
(Continued)

(58) Field of Classification Search
CPC ............... H04W 72/0426; H04W 8/24; H04W 74/0833; H04W 76/025; H04W 88/02; H04W 88/10
See application file for complete search history.

(56) References Cited

U.S. PATENT DOCUMENTS

9,078,241 B2 * 7/2015 Yamada .............. H04W 76/025
2013/0021929 A1 1/2013 Kim
(Continued)

FOREIGN PATENT DOCUMENTS

JP 2014-187651 A 10/2014

OTHER PUBLICATIONS

International Search Report issued in PCT/JP2014/059839, dated Jul. 8, 2014.
(Continued)

*Primary Examiner* — Abdelnabi O Musa
(74) *Attorney, Agent, or Firm* — Studebaker & Brackett PC

(57) ABSTRACT

A base station is used for a mobile communication system that supports a dual connectivity. The base station includes a controller configured to establish an RRC connection with a user terminal, and to perform a mobility control in the dual connectivity.

2 Claims, 17 Drawing Sheets

Related U.S. Application Data continuation of application No. 14/874,062, filed on Oct. 2, 2015, now Pat. No. 9,451,609, which is a continuation of application No. PCT/JP2014/059839, filed on Apr. 3, 2014.

(60) Provisional application No. 61/808,794, filed on Apr. 5, 2013, provisional application No. 61/864,186, filed on Aug. 9, 2013, provisional application No. 61/934,241, filed on Jan. 31, 2014.

(51) Int. Cl.
| | | |
|---|---|---|
| | *H04W 76/02* | (2009.01) |
| | *H04W 76/04* | (2009.01) |
| | *H04W 74/08* | (2009.01) |
| | *H04W 8/24* | (2009.01) |
| | *H04W 88/10* | (2009.01) |
| | *H04W 88/02* | (2009.01) |

(52) U.S. Cl.
CPC ....... *H04W 76/025* (2013.01); *H04W 76/046* (2013.01); *H04W 88/02* (2013.01); *H04W 88/10* (2013.01)

(56) References Cited

U.S. PATENT DOCUMENTS

| | | | |
|---|---|---|---|
| 2014/0293896 A1* | 10/2014 | Kuo | H04W 72/0413 370/329 |
| 2015/0319801 A1* | 11/2015 | Lee | H04W 56/00 370/329 |
| 2015/0341977 A1* | 11/2015 | Fukuta | H04W 16/32 370/329 |
| 2015/0351119 A1* | 12/2015 | Song | H04W 72/1268 370/329 |
| 2016/0029252 A1 | 1/2016 | Uchino et al. | |

OTHER PUBLICATIONS

Written Opinion issued in PCT/JP2014/059839, dated Jul. 8, 2014.
3GPP TSG-RAN WG2 Meeting #81, R2-130614, Jan. 28 to Feb. 1, 2013, St. Julian's, Malta, Samsung, Preliminary discussion on inter-ENB Carrier Aggregation.
3GPP TSG-RAN WG2 Meeting #81bis, R2-131108, Chicago, USA, Apr. 15-19, 2013, Nokia Corporation, Nokia Siemens Networks, C-plane alternatives for dual-connectivity.
3GPP TSG-RAN2# 81, R2-130488, Jan. 28-Feb. 1, 2013, St. Julian's, Malta, NTT Docomo, Inc., Necessity of C-plane architecture enhancements for dual connectivity.
3GPP TSG RAN WG2 Meeting #81, R2-130403, St. Julian's, Malta, Jan. 28-Feb. 1, 2013, New Postcom, Mobility mechanisms consideration for dual connectivity.
3GPP TSG-RAN2 #81 Meeting, R2-130282, St. Julian's, Malta, Jan. 28-Feb. 1, 2012, MediaTek Inc., Measurement and cell identification enhancements in small cell.
3GPP TSG-RAN Meeting#58, RP-122033, Barcelona, Spain, Dec. 4-7, 2012, New Study Item Description: Small Cell enhancements for E-UTRA and E-UTRAN—Higher-layer aspects.
An Office Action; "Notice of Reasons for Rejection," issued by the Japanese Patent Office on Feb. 9, 2016, which corresponds to Japanese Patent Application No. 2015-510128 and is related to U.S. Appl. No. 14/874,062; with English language statement of relevance.
3rd Generation Partnership Project (3GPP); "Mobility Enhancment for Small Cell"; ZTE Corporation; 3GPP Draft: R2-130135; vol. RAN WG2; St. Julian's, Malta, Jan. 28, 2013-Feb. 1, 2013.
3rd Generation Partnership Project (3GPP); "Connectivity Models for Small Cell Enhancement"; LG Electronics Inc.; 3GPP Draft, R2-130314; vol. RAN WG2; St. Julian's, Malta, Jan. 28, 2013-Feb. 1, 2013.
3rd Generation Partnership Project (3GPP); Technical Specification Group Radio Access Network; Evolved Universal Terrestrial Radio Access (E-UTRA) and Evolved Universal Terrestrial Radio Access Network (E-UTRAN); overall description; Stage 2 (Release 11); 3GPP Standard; 3GPP TS 36.300 vol. RAN WG2, v11.3.0; pp. 1-205; Sep. 24, 2012.
The extended European search report issued by the European Patent Office on Oct. 14, 2016, which corresponds to European Patent Application No. 14779720.3-1857 and is related to U.S. Appl. No. 15/240,405.

\* cited by examiner

MOBILE COMMUNICATION SYSTEM THAT SUPPORTS A DUAL CONNECTIVITY MANAGEMENT

CROSS REFERENCE TO RELATED APPLICATIONS

This application is a Continuation Application of U.S. patent application Ser. No. 15/240,405, filed Aug. 18, 2016, which is a Continuation Application of U.S. patent application Ser. No. 14/874,062, filed Oct. 2, 2015, which is a Continuation Application of International Application No. PCT/JP2014/059839, filed Apr. 3, 2014, which claims benefit of U.S. Provisional Application No. 61/808,794, filed Apr. 5, 2013, U.S. Provisional Application No. 61/864,186, filed Aug. 9, 2013, and U.S. Provisional Application No. 61/934,241, filed Jan. 31, 2014, the entire contents of which are incorporated herein by reference.

TECHNICAL FIELD

The present disclosure relates to a mobile communication system that supports a dual connectivity.

BACKGROUND ART

In 3GPP (3rd Generation Partnership Project) which is a project aiming to standardize a mobile communication system, introduction of a dual connectivity has been discussed (see Non-patent document 1).

The dual connectivity is a scheme in which a user terminal establishes a pair of connections with a pair of cells which is a combination of cells managed by different base stations.

PRIOR ART DOCUMENT

Non-Patent Document

Non-patent document 1: 3GPP Contribution RP-122033

SUMMARY

However, in the current situation, there is a problem that there is no mechanism for appropriately controlling the dual connectivity.

Therefore, the present disclosure provides a master base station for a mobile communication system capable of appropriately controlling the dual connectivity.

A master base station for a mobile communication system that supports a dual connectivity, the master base station comprising a controller containing a processor and a memory, and configured to establish an RRC (Radio Resource Control) connection with a user terminal, and to perform a mobility control in the dual connectivity, wherein the controller receives, from the user terminal, capability information on capability of the dual connectivity of the user terminal, and decides whether to apply the dual connectivity to the user terminal based on the capability information, the controller transmits, to a secondary base station, an allocation request requesting an allocation of additional radio resources for the user terminal in response to the master base station deciding to start the dual connectivity, wherein the controller transmits, to the secondary base station, context information on the user terminal and configuration parameters in the master base station, the controller receives a response from the secondary base station after a transmission of the allocation request, the response including information on a random access channel to be used by the user terminal to perform a random access to the secondary base station, the controller receives, from the secondary base station that allocates additional radio resources to the user terminal during the dual connectivity, a notification indicating a release request requesting a release of the additional radio resources, wherein the controller receives the release request notification in response to the secondary base station ending the dual connectivity based on radio condition between the user terminal and the secondary base station, and the controller receives, from the secondary base station, remaining downlink data that has not been acknowledged by the user terminal, in response to the master base station confirming the release of the additional radio resources.

A master base station for a mobile communication system that supports a dual connectivity, the master base station comprising a controller containing a processor and a memory, and configured to establish an RRC (Radio Resource Control) connection with a user terminal, and to perform a mobility control in the dual connectivity, wherein the controller decides a splitting mode of traffic of the user terminal between the master base station and a secondary base station, and notifies the user terminal of the decided splitting mode, in response to starting the dual connectivity or during an execution of the dual connectivity, the controller transmits, to the secondary base station, an allocation request requesting an allocation of additional radio resources for the user terminal in response to the master base station deciding to start the dual connectivity, wherein the controller transmits, to the secondary base station, context information on the user terminal and configuration parameters in the master base station, the controller receives a response from the secondary base station after a transmission of the allocation request, the response including information on a random access channel to be used by the user terminal to perform a random access to the secondary base station, the controller receives, from the secondary base station that allocates additional radio resources to the user terminal during the dual connectivity, a notification indicating a release request requesting a release of the additional radio resources, wherein the controller receives the release request notification in response to the secondary base station ending the dual connectivity based on radio condition between the user terminal and the secondary base station, and the controller receives, from the secondary base station, remaining downlink data that has not been acknowledged by the user terminal, in response to the master base station confirming the release of the additional radio resources.

DESCRIPTION OF EMBODIMENTS

Overview of Embodiments

Figure 1:
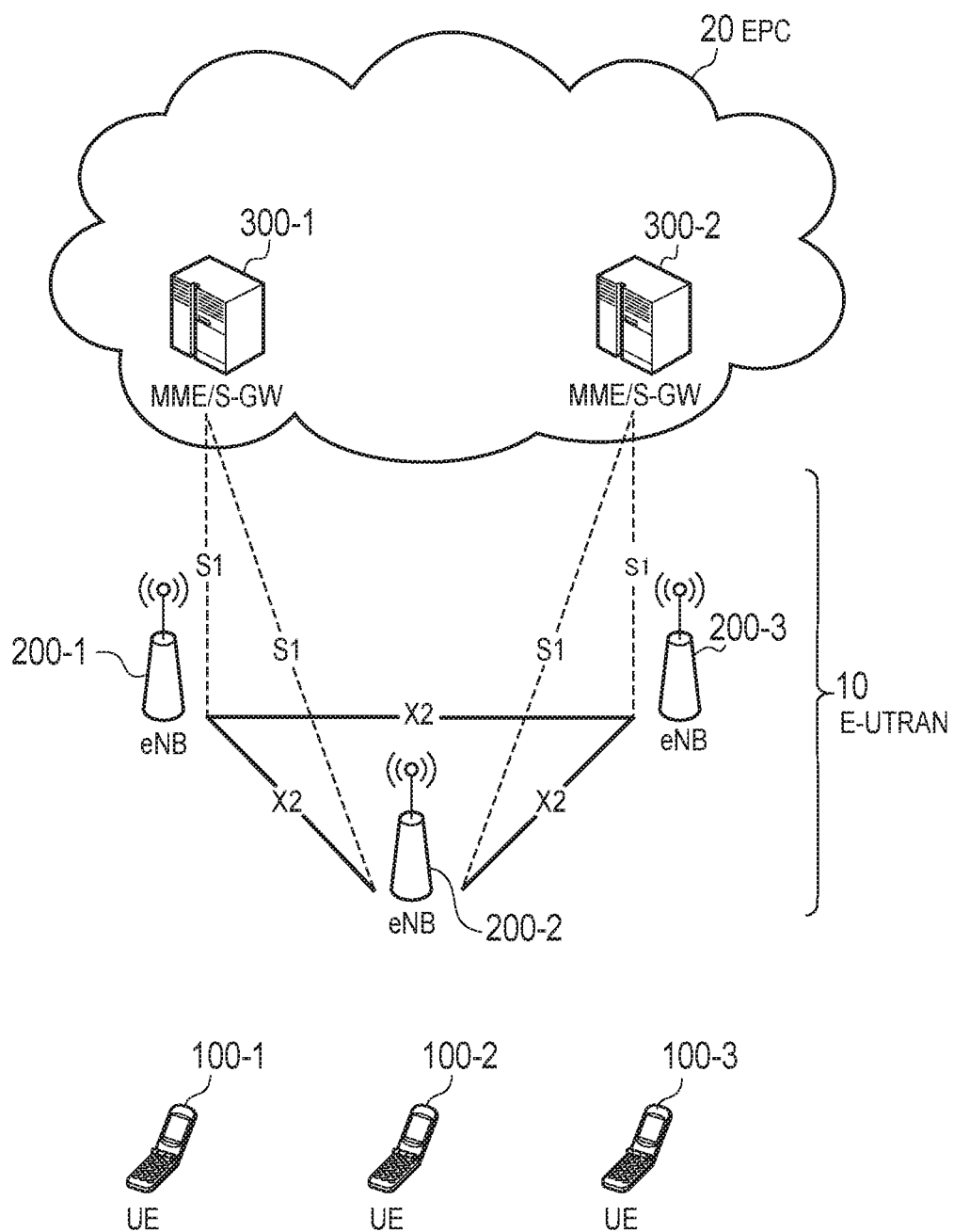
FIG. 1 is a configuration diagram of an LTE system according to a first embodiment and a second embodiment.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station. The first base station transmits, to the second base station, an allocation request requesting additional radio resources for the user terminal when the first base station decides to start the dual connectivity.

In the embodiments, the second base station transmits a response to the first base station in accordance with a reception of the establishment request, the response including information on a random access channel to be used for performing a random access to the second base station by the user terminal.

In the embodiments, upon receiving the response, the first base station transmits, to the second base station, context information on the user terminal and configuration parameters in the first base station.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The first base station transmits, to the second base station, a release request requesting a release of the additional radio resources when the first base station decides to end the dual connectivity.

In the embodiments, upon receiving the release request, the second base station transmits, to the first base station, a release notification for notifying release of the additional radio resources. After a transmission of the release notification, the second base station transmits, to the first base station, data that the second base station has not transmitted to the user terminal.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The second base station queries the first base station regarding a feasibility of release of the additional radio resources when the second base station decides to end the dual connectivity.

In the embodiments, the second base station transmits, to the first base station, a release notification for the additional radio resources when the first base station allows the release of the additional radio resources. After a transmission of the release notification, the second base station transmits, to the first base station, data that the second base station has not transmitted to the user terminal A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The second base station releases the additional radio resources and transmits, to the first base station, a notification indicating that an allocation of the additional radio resources can't be maintained, when the second base station decides that the allocation of the additional radio resources has to be ended.

In the embodiments, after a transmission of the notification, the second base station transmits, to the first base station, data that the second base station has not transmitted to the user terminal.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The second base station transmits, to the first base station, a release notification indicating a release of the additional radio resources when the second base station decides to end the dual connectivity based on a measurement report from the user terminal.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The user terminal transmits a first CQI report to the first base station and a second CQI report to the second base station during the dual connectivity.

A mobile communication system according to embodiments supports a dual connectivity. The mobile communication system comprises: a first base station that performs a mobility control in the dual connectivity; and a second base station that is adjacent to the first base station. The second base station transmits broadcast information for prohibiting the user terminal that supports the dual connectivity from camping on a cell of the second base station. The user terminal that is in an idle state camps on a cell of the first base station without camping on the cell of the second base station, based on the broadcast information.

In the embodiments, the broadcast information is information indicating a specific access class. The user terminal decides that camping on the cell of the second base station is prohibited when an access class of the user terminal is the specific access class.

In the embodiments, the broadcast information is information indicating an access regulation for a user terminal conforming to a specific release that supports the dual connectivity. The user terminal decides that camping on the cell of the second base station is prohibited when the release to which the user terminal conforms is the specific release and when the user terminal supports the dual connectivity.

A mobile communication system according to embodiments supports a dual connectivity. The mobile communication system comprises: a first base station that performs a mobility control in the dual connectivity; and a second base station that is adjacent to the first base station. The user terminal that is camping on a cell of the second base station in an idle state establishes a connection with the first base station after re-selecting a cell of the first base station, when starting communication in which the dual connectivity should be applied.

A mobile communication system according to embodiments comprises: a base station that manages a cell; and a user terminal that support a dual connectivity with cells belonging to different frequencies. The user terminal transmits capability information indicating a frequency band for which the user terminal can use in the dual connectivity. The base station determines whether to apply the dual connectivity to the user terminal based on the capability information.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The first base station decides a splitting mode of traffic of the user terminal, before starting the dual connectivity or during an execution of the dual connectivity.

A mobile communication system according to embodiments supports a dual connectivity. The mobile communication system comprises: a first base station that establishes an RRC connection with a user terminal, and performs a mobility control in the dual connectivity; and a second base station that is adjacent to the first base station, and allocates additional radio resources to the user terminal during the dual connectivity. The first base station instruct a start of the dual connectivity to the user terminal when starting the dual connectivity.

A user terminal according to embodiments supports a dual connectivity scheme in which connections with a plurality of cells managed by different base stations are established simultaneously. The user terminal comprises: a controller configured to perform a cell reselection for selecting a serving cell of the user terminal in an idle state. The plurality of cells include a first cell and a second cell, the second cell having a coverage narrower than a coverage of the first cell. The controller performs a cell reselection control for selecting the first cell as the serving cell without selecting the second cell as the serving cell.

In the embodiments, the user terminal further comprises: a receiver configured to receive control information used for the cell reselection control, from the first cell or the second cell. The first cell belongs to a first frequency, and the second cell belongs to a second frequency. The control information is information for relatively lowering a priority of the second frequency than a priority of the first frequency in the cell reselection. The controller performs the cell reselection control on the basis of the control information.

In the embodiments, the controller notifies the first cell of capability information indicating that the user terminal supports the dual connectivity scheme, in a case where the RRC connection is established with the first cell. The receiver receives the control information transmitted in unicast from the first cell to the user terminal.

In the embodiments, the user terminal comprises: a receiver that receives broadcast information used for the cell reselection control from the second cell. The broadcast information is information indicating an access restriction on a user terminal that supports the dual connectivity scheme. The controller performs the cell reselection control based on the broadcast information.

In the embodiments, the controller performs a process for establishing a connection with the second cell irrespective of the access restriction, when the user terminal is controlled to establish the connection with the second cell from the first cell after establishing the RRC connection with the first cell.

In the embodiments, the controller acquires a list that includes an identifier of the second cell, from a network including the plurality of cells. The controller performs the cell reselection control based on the list.

In the embodiments, the cell reselection control is a control that prohibits a selection of the second cell as the serving cell.

In the embodiments, the cell reselection control is a control that relatively lowers a priority of the second cell than a priority of the first cell in the cell reselection.

In the embodiments, the user terminal comprises: a receiver that receives broadcast information used for the cell reselection control from the second cell. The broadcast information is information indicating a cell type of a cell from which the broadcast information is transmitted. The controller performs the cell reselection control on the basis of the broadcast information.

In the embodiments, the cell reselection control is a control that prohibits a selection of the second cell as the serving cell.

In the embodiments, the cell reselection control is a control that relatively lowers a priority of the second cell than a priority of the first cell in the cell reselection.

A communication control method according to embodiments comprises a step of performing, by a user terminal supporting a dual connectivity scheme in which connections with a plurality of cells managed by different base stations are established simultaneously, a cell reselection for selecting a serving cell of the user terminal in an idle state. The plurality of cells include a first cell and a second cell, the second cell having a coverage narrower than a coverage of the first cell. The step of performing the cell reselection comprises a step of performing a cell reselection control for selecting the first cell as the serving cell without selecting the second cell as the serving cell.

A processor according to embodiments is provided with a user terminal supporting a dual connectivity scheme in which connections with a plurality of cells managed by different base stations are established simultaneously. The processor executes a step of performing a cell reselection for selecting a serving cell of the user terminal in an idle state. The plurality of cells include a first cell and a second cell, the second cell having a coverage narrower than a coverage of the first cell. The step of performing the cell reselection comprises a step of performing a cell reselection control for selecting the first cell as the serving cell without selecting the second cell as the serving cell.

First Embodiment

Hereinafter, with reference to the accompanying drawings, an embodiment will be described in a case where the present disclosure is applied to LTE (Long Term Evolution) standardized by 3GPP.

(Configuration of LTE system)

FIG. 1 is a configuration diagram of an LTE system according to a first embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 constitute a network of the LTE system.

The UE 100 is a mobile communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to the base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a routing function for user data, and a measurement control function for mobility control and scheduling.

The EPC 20 includes a plurality of MME (Mobility Management Entity)/S-GWs (Serving-Gateways) 300. The MME is a network node that performs various mobility controls and the like for the UE 100 and corresponds to a controller. The S-GW is a network node that performs control to transfer user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
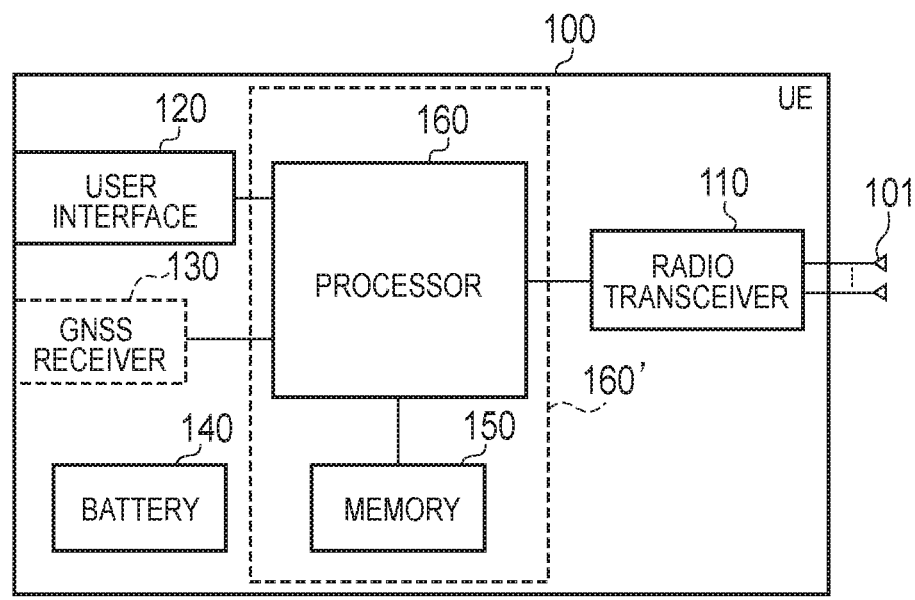
FIG. 2 is a block diagram of UE according to the first embodiment and the second embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
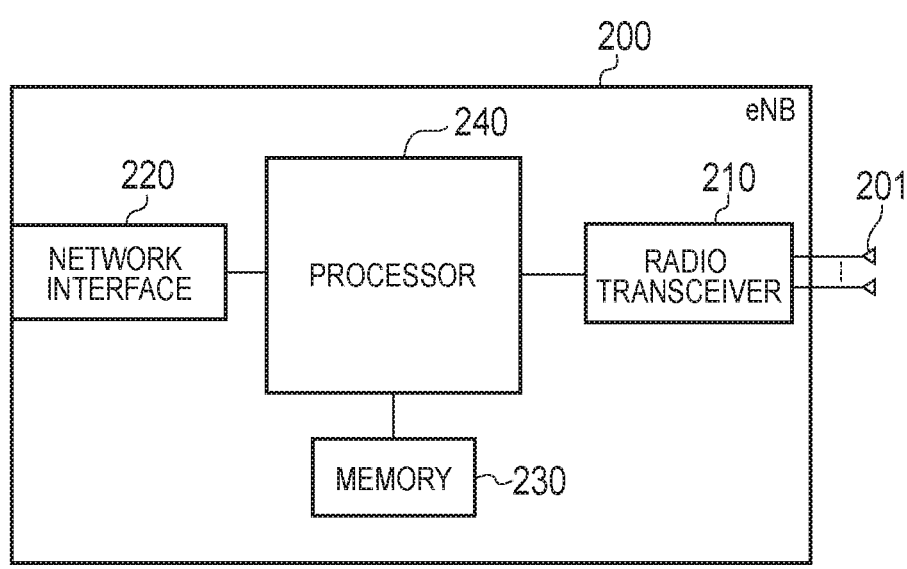
FIG. 3 is a block diagram of eNB according to the first embodiment and the second embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
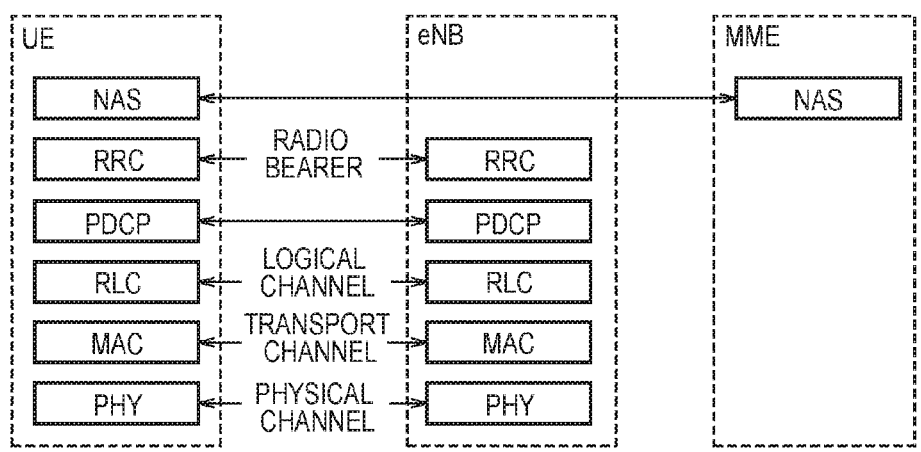
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, a retransmission process by hybrid ARQ (HARQ), and the like. Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler that decides a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of configuration is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
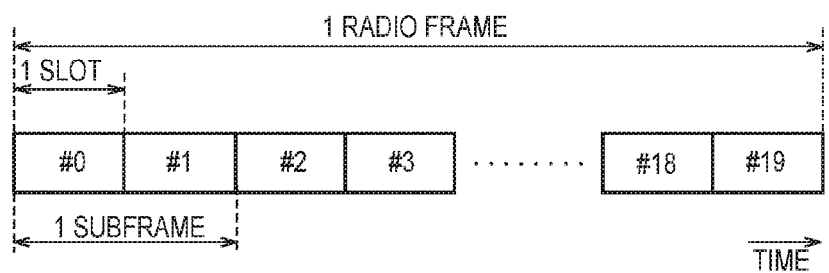
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(Dual Connectivity)

The LTE system according to the first embodiment supports a dual connectivity. The dual connectivity is a scheme in which the UE 100, establish a pair of connections with a pair of cells which is a combination of cells managed by different eNBs 200.

In the dual connectivity, one of the eNBs 200 performs mobility control (Mobility management) of the UE 100. That is, the one eNB 200 establishes an RRC connection with the UE 100 and performs handover control and the like for the UE 100. The other eNB 200 does not perform mobility control of the UE 100. The other eNB 200 does not necessarily establish an RRC connection with the UE 100. It may suffice that the other eNB 200 establishes a connection as far as the MAC layer or a connection as far as the RLC layer (an L2 connection), with the UE 100.

In the dual connectivity, a radio resource is assigned to the UE 100 from the each cell of the pair of cells. That is, each of the eNBs 200, which manages the pair of cells, performs scheduling of the radio resource for the UE 100.

Operation According to First Embodiment

Figure 6:
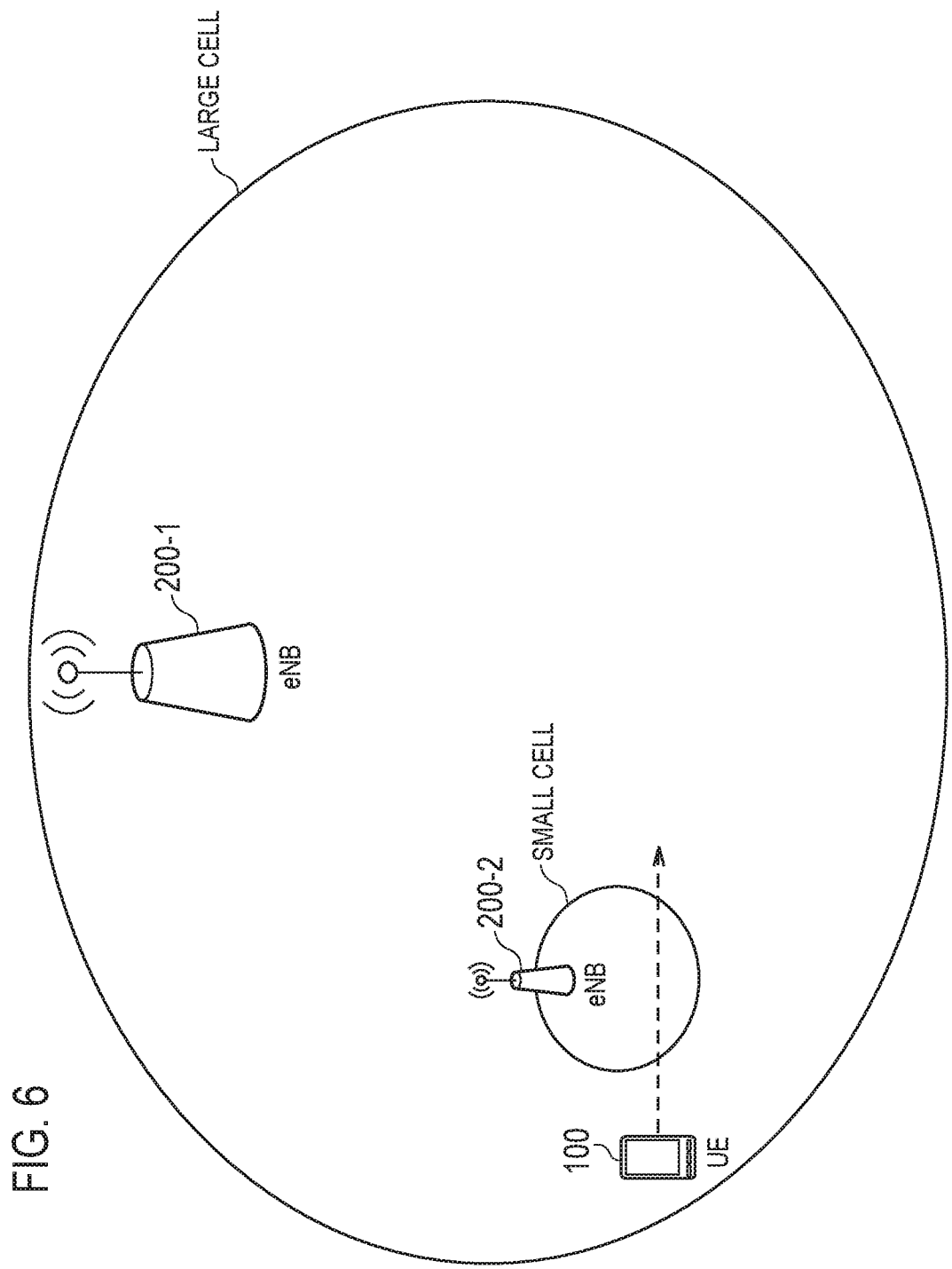
FIG. 6 is a diagram illustrating an operation environment according to the first embodiment and the second embodiment.

Hereinafter, an operation according to the first embodiment will be described. FIG. 6 is a diagram illustrating an operation environment according to the first embodiment.

As illustrated in FIG. 6, eNB 200-1 manages a large cell. The large cell is a general cell in the LTE system, and is called a macro cell. The eNB 200-1 corresponds to the first base station, and the large cell corresponds to the first cell. In the dual connectivity, the eNB 200-1 performs mobility control of the UE 100.

eNB 200-2 that is adjacent to the eNB 200-1 manages a small cell. The small cell is a cell having a smaller coverage than the large cell, and is called a pico cell or a femto cell. The eNB 200-2 may also be a home base station (HeNB). The eNB 200-2 corresponds to the second base station, and the small cell corresponds to the second cell. In the dual connectivity, the eNB 200-2 does not perform mobility control of the UE 100.

The small cell is provided within the coverage area of the large cell. Further, the small cell belongs to a frequency that is different from a frequency to which the large cell belongs.

The UE 100 supports a dual connectivity with a pair of cells which belong to different frequencies (Inter-frequency dual connectivity). Thus, the UE 100 can establish a first connection with the eNB 200-1 and establish a second connection with the eNB 200-2 to perform the dual connectivity (Inter-frequency dual connectivity). Hereinafter, it is assumed that the "dual connectivity" means the Inter-frequency dual connectivity.

Subsequently, operation patterns 1 and 2 according to the first embodiment will be described. The operation pattern 1 is an operation pattern in which, first of all, the UE 100 establishes the first connection with the eNB 200-1. In contrast, the operation pattern 2 is an operation pattern in which, first of all, the UE 100 establishes the second connection with the eNB 200-2.

(a) Operation Pattern 1-1

Figure 7:
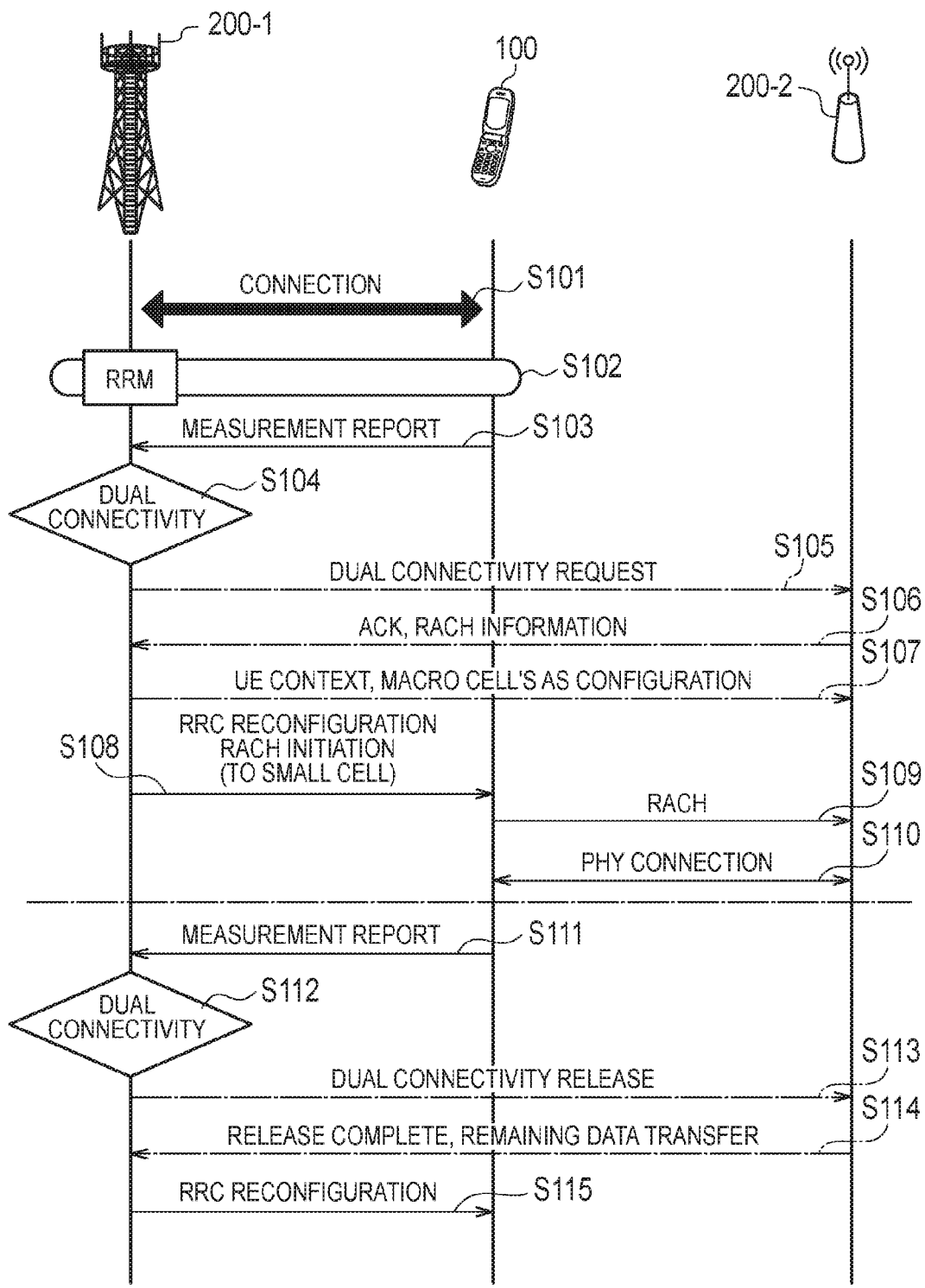
FIG. 7 is a sequence diagram of an operation pattern 1-1 according to the first embodiment.

FIG. 7 is a sequence diagram of an operation pattern 1-1 according to the first embodiment. In the operation pattern 1-1, the eNB 200-2 does not perform the RRM (Radio Resource Management) of the UE 100.

As illustrated in FIG. 7, in step S101, the UE 100 establishes the first connection (an RRC connection) with the eNB 200-1. As a result, the UE 100 shifts from an idle state (RRC idle state) to a connected state (RRC connected state).

In step S102, the eNB 200-1 performs the RRM of the UE 100. Specifically, measurement for the mobility control of the UE 100 is controlled.

In step S103, the UE 100 transmits a measurement report to the eNB 200-1 under the control of the eNB 200-1. The measurement report includes each of measurement results of the serving cell of the UE 100 (the large cell) and a neighboring cell (the small cell). The measurement result includes received power of a reference signal and the like.

In step S104, the eNB 200-1 decides whether or not to start a dual connectivity based on the measurement report from the UE 100. For example, the eNB 200-1 decides to start the dual connectivity when each of the measurement results of the cell of the eNB 200-1 and the neighboring cell (the small cell) exceeds a threshold value. Hereinafter, a description will be given on the assumption that it is decided to start the dual connectivity.

In step S105, the eNB 200-1 transmits, to the eNB 200-2, an establishment request (a Dual connectivity request) requesting to establish the second connection with the UE 100.

In step S106, upon receiving the establishment request (the Dual connectivity request), the eNB 200-2 transmits, to the eNB 200-1, a positive response (ACK) to the establishment request. The positive response includes information on a random access channel (RACH information) that should be used at the time of establishing the second connection. The establishment request corresponds to an allocation request for additional radio resources.

In step S107, upon receiving the positive response (the ACK), the eNB 200-1 transmits, to the eNB 200-2, context information of the UE 100 (UE context) and configuration parameters (an AS configuration) in the eNB 200-1.

In step S108, the eNB 200-1 transmits configuration information (an RRC reconfiguration), which is used by the UE 100 in order to establish the second connection with the eNB 200-2, to the UE 100. Here, the eNB 200-1 transmits the RACH information received from the eNB 200-2 in the configuration information (the RRC reconfiguration).

In step S109, the UE 100 performs a random access (RACH) process to the eNB 200-2 based on the configuration information (the RRC reconfiguration) received from the eNB 200-1.

In step S110, the UE 100 and the eNB 200-2 establish the second connection (for example, the L2 connection). As a result, the dual connectivity is started. In the dual connectivity, the UE 100 can communicate with each of the eNBs 200-1 and 200-2, and thus, it is possible to achieve high throughput.

In step S111, the UE 100 transmits a measurement report to the eNB 200-1 under the control of the eNB 200-1. The measurement report includes each of measurement results of the serving cell of the UE 100 (the large cell) and a neighboring cell (the small cell).

In step S112, the eNB 200-1 decides whether or not to end the dual connectivity based on the measurement report received from the UE 100. For example, the eNB 200-1 decides to end the dual connectivity when the measurement result of the neighboring cell (the small cell) falls short of a threshold value. Hereinafter, a description will be given on the assumption that it is decided to end the dual connectivity.

In step S113, the eNB 200-1 transmits, to the eNB 200-2, a release decision notification (Dual connectivity release) notifying the decision of release of the second connection with the UE 100. The release decision notification corresponds to release request for additional radio resources.

In step S114, upon receiving the release decision notification (the Dual connectivity release), the eNB 200-2 transmits, to the eNB 200-1, a release notification (Release Complete) of the second connection. Here, along with the release notification (or after the release notification), the eNB 200-2 transmits (transfers), to the eNB 200-1, the data that the eNB 200-2 has not transmitted to the UE 100. The eNB 200-1 will transmit the non-transmitted data to the UE 100.

In step S115, upon receiving the release notification (Release Complete), the eNB 200-1 transmits configuration information (an RRC reconfiguration), which is used by the UE 100 in order to release the second connection with the eNB 200-2, to the UE 100.

(b) Operation Pattern 1-2

Figure 8:
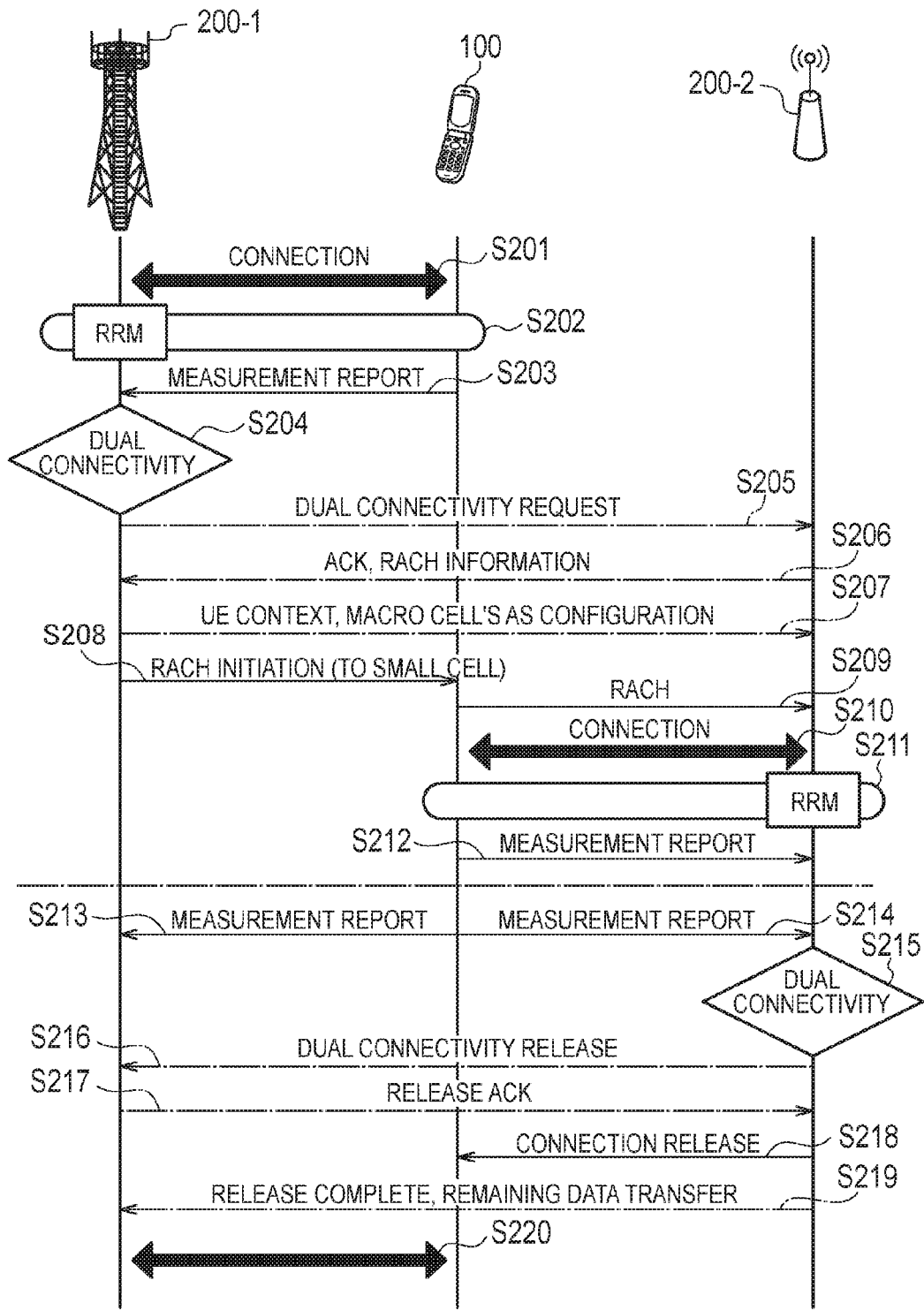
FIG. 8 is a sequence diagram of an operation pattern 1-2 according to the first embodiment.

FIG. 8 is a sequence diagram of an operation pattern 1-2 according to the first embodiment. In the operation pattern 1-2, the eNB 200-2 performs the RRM of the UE 100.

As illustrated in FIG. 8, steps S201 to S207 are similar to steps S101 to S107 of the operation pattern 1-1.

In step S208, the eNB 200-1 transmits instruction information (RACH initiation), which is used by the UE 100 in order to establish the second connection with the eNB 200-2, to the UE 100. Here, the eNB 200-1 transmits the RACH information received from the eNB 200-2 in the instruction information (RACH initiation).

In step S209, the UE 100 performs the random access (RACH) process to the eNB 200-2 based on the instruction information (RACH initiation) received from the eNB 200-1.

In step S210, the UE 100 and the eNB 200-2 establish the second connection (the RRC connection). As a result, the dual connectivity is started. In the dual connectivity, the UE 100 can communicate with each of the eNBs 200-1 and 200-2, and thus, it is possible to achieve high throughput.

In step S211, the eNB 200-2 performs the RRM of the UE 100. Specifically, measurement for deciding whether or not the second connection (the RRC connection) should be maintained, that is, whether or not the dual connectivity should be ended is controlled.

In step S212, the UE 100 transmits a measurement report (a second measurement report) to the eNB 200-2 under the control of the eNB 200-2. The second measurement report includes the measurement result of the cell of eNB 200-2 (the small cell).

Then, in step S213, the UE 100 transmits a measurement report (a first measurement report) to the eNB 200-1 under the control of the eNB 200-1. The first measurement report includes each of measurement results of the serving cell of the UE 100 (the large cell) and a neighboring cell (the small cell). That is, the first measurement report is used in the mobility control of the UE 100 in the eNB 200-1.

In step S214, the UE 100 transmits a measurement report (the second measurement report) to the eNB 200-2 under the control of the eNB 200-2. The second measurement report includes the measurement result of the cell of eNB 200-2 (the small cell). That is, the second measurement report is used in deciding whether or not to end the dual connectivity in the eNB 200-2.

In step S215, the eNB 200-2 decides whether or not to end a dual connectivity based on the second measurement report received from the UE 100. For example, the eNB 200-2 decides to end the dual connectivity when the measurement result of the cell of the eNB 200-1 (the small cell) falls short of a threshold value. Hereinafter, a description will be given on the assumption that it is decided to end the dual connectivity.

In step S216, the eNB 200-2 inquires of the eNB 200-1 about the feasibility of release of the second connection with the UE 100.

In step S217, upon receiving the inquiry (Dual connectivity release) from the eNB 200-2, the eNB 200-1 transmits, to the eNB 200-2, a positive response (a Release ACK).

In step S218, upon receiving the positive response (the Release ACK) from the eNB 200-1, the eNB 200-2 releases the second connection with the UE 100.

In step S219, the eNB 200-2 transmits, to the eNB 200-1, a release notification (a Release Complete) of the second connection. Here, along with the release notification (or after the release notification), the eNB 200-2 transmits (transfers), to the eNB 200-1, the data that the eNB 200-2 has not transmitted to the UE 100. The eNB 200-1 will transmit the non-transmitted data to the UE 100.

In step S220, the eNB 200-1 maintains the first connection with the UE 100.

It is noted that the processes after step S218 can be changed as follows.

Figure 9:
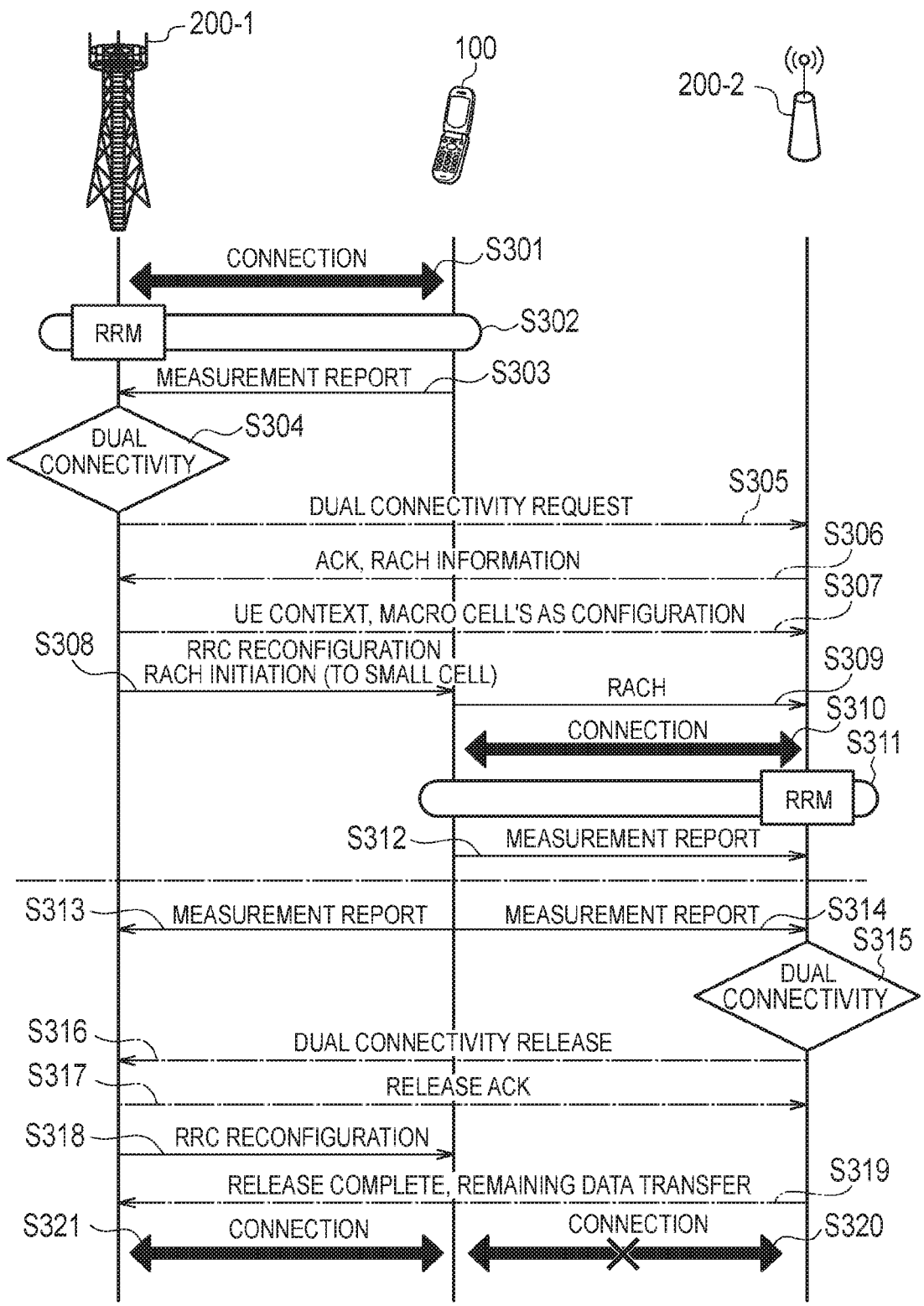
FIG. 9 is a sequence diagram of a modification of the operation pattern 1-2 according to the first embodiment.

FIG. 9 is a sequence diagram of a modification of the operation pattern 1-2 according to the first embodiment.

As illustrated in FIG. 9, after transmitting the positive response (the Release ACK) to the eNB 200-2, the eNB 200-1 transmits, to the UE 100, a release request (the RRC reconfiguration) of the second connection (step S318). Then, upon receiving the release request (the RRC reconfiguration) from the eNB 200-1, the UE 100 releases the second connection (step S320). The other operations are similar to those of the operation pattern 1-2.

Alternatively, the eNB 200-2 may release the second connection without inquiring (dual connectivity release) of the eNB 200-1. Specifically, the eNB 200-2 transmits, to the eNB 200-1, the release notification (the Release Complete) of the second connection after releasing the second connection, when deciding to end the dual connectivity based on the measurement report (the second measurement report) received from the UE 100. At this time, along with the release notification (or after the release notification), the eNB 200-2 transmits, to the eNB 200-1, the data that the eNB 200-2 has not transmitted to the UE 100.

Alternatively, the eNB 200-2 transmits, to the eNB 200-1, the release decision notification (the Dual connectivity release) of the second connection without releasing the second connection, when deciding to end the dual connectivity based on the measurement report (the second measurement report) received from the UE 100. Upon receiving the release decision notification from the eNB 200-2, the eNB 200-1 transmits, to the UE 100, a release request (an RRC reconfiguration) of the second connection. Upon receiving the release request from the eNB 200-1, the UE 100 releases the second connection.

(c) Operation Pattern 2-1

Figure 10:
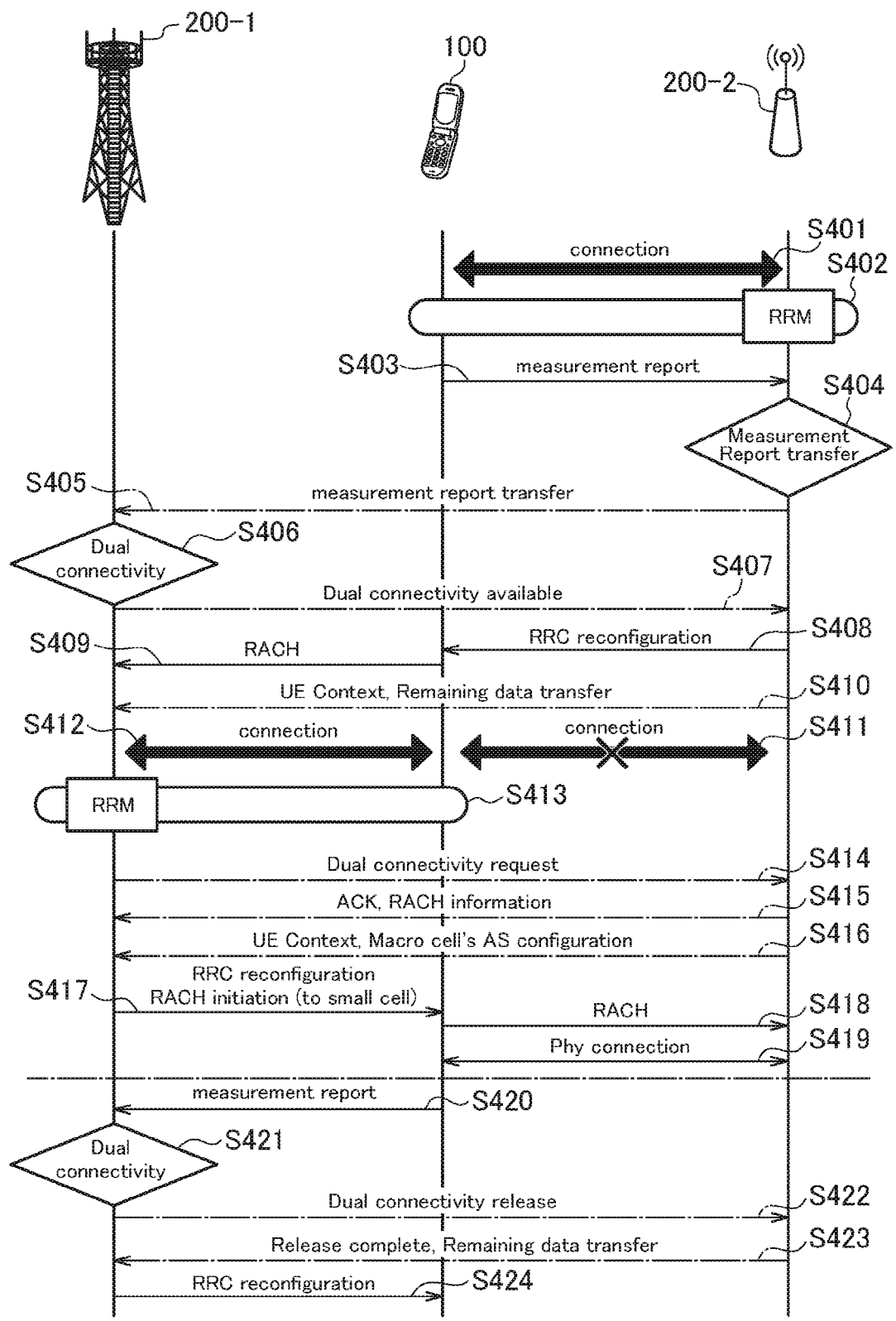
FIG. 10 is a sequence diagram of an operation pattern 2-1 according to the first embodiment.

FIG. 10 is a sequence diagram of an operation pattern 2-1 according to the first embodiment.

As illustrated in FIG. 10, in step S401, the UE 100 establishes the second connection (the RRC connection) with the eNB 200-2. As a result, the UE 100 shifts from an idle state (RRC idle state) to a connected state (RRC connected state).

In step S402, the eNB 200-2 performs the RRM of the UE 100. Specifically, measurement for the mobility control of the UE 100 is controlled.

In step S403, the UE 100 transmits a measurement report to the eNB 200-2 under the control of the eNB 200-2. The measurement report includes each of measurement results of the serving cell of the UE 100 (the small cell) and a neighboring cell (the large cell).

In step S404, the eNB 200-2 decides to transfer the measurement report to the eNB 200-1 based on the measurement report received from the UE 100. The eNB 200-2 may decide to transfer the measurement report to the eNB 200-1, when a condition under which a dual connectivity can be started, for example, a condition where each of the measurement results of the cell of the eNB 200-2 and the neighboring cell (the large cell) exceeds a threshold value, is satisfied.

In step S405, the eNB 200-2 transfers, to the eNB 200-1, the measurement report received from the UE 100.

In step S406, the eNB 200-1 decides whether or not to start a dual connectivity based on the measurement report transferred from the eNB 200-2. For example, the eNB 200-1 decides to start the dual connectivity when each of the measurement results of the cell of the eNB 200-1 (the large cell) and the neighboring cell (the small cell) exceeds a threshold value. Hereinafter, a description will be given on the assumption that it is decided to start the dual connectivity.

In step S407, the eNB 200-1 transmits, to the eNB 200-2, a start notification of the dual connectivity (Dual connectivity available). A handover procedure for the UE 100 to the eNB 200-1 is triggered by the start notification (Dual connectivity available).

In step S408, upon receiving the start notification (Dual connectivity available), the eNB 200-2 starts the handover procedure for the UE 100 to the eNB 200-1. The eNB 200-2 transmits, to the UE 100, configuration information (an RRC reconfiguration) for performing the handover of the UE 100 to the eNB 200-1.

In step S409, the UE 100 performs a random access (RACH) process to the eNB 200-1 based on the configuration information (the RRC reconfiguration) received from the eNB 200-2.

In step S410, the eNB 200-2 transmits, to the eNB 200-1, context information (a UE context) of the UE 100 and non-transmitted data for the UE 100.

In step S411, the UE 100 and the eNB 200-2 release the connection (the RRC connection).

In step S412, the UE 100 and the eNB 200-1 establish a connection (an RRC connection).

In step S413, the eNB 200-1 performs the RRM of the UE 100. Then, procedures to start a dual connectivity are started. In step S414, the eNB 200-1 transmits, to the eNB 200-2, an establishment request (a Dual connectivity request) requesting to establish the second connection with the UE 100. Subsequent operations are similar to those of the operation pattern 1-1.

(d) Operation Pattern 2-2

Figure 11:
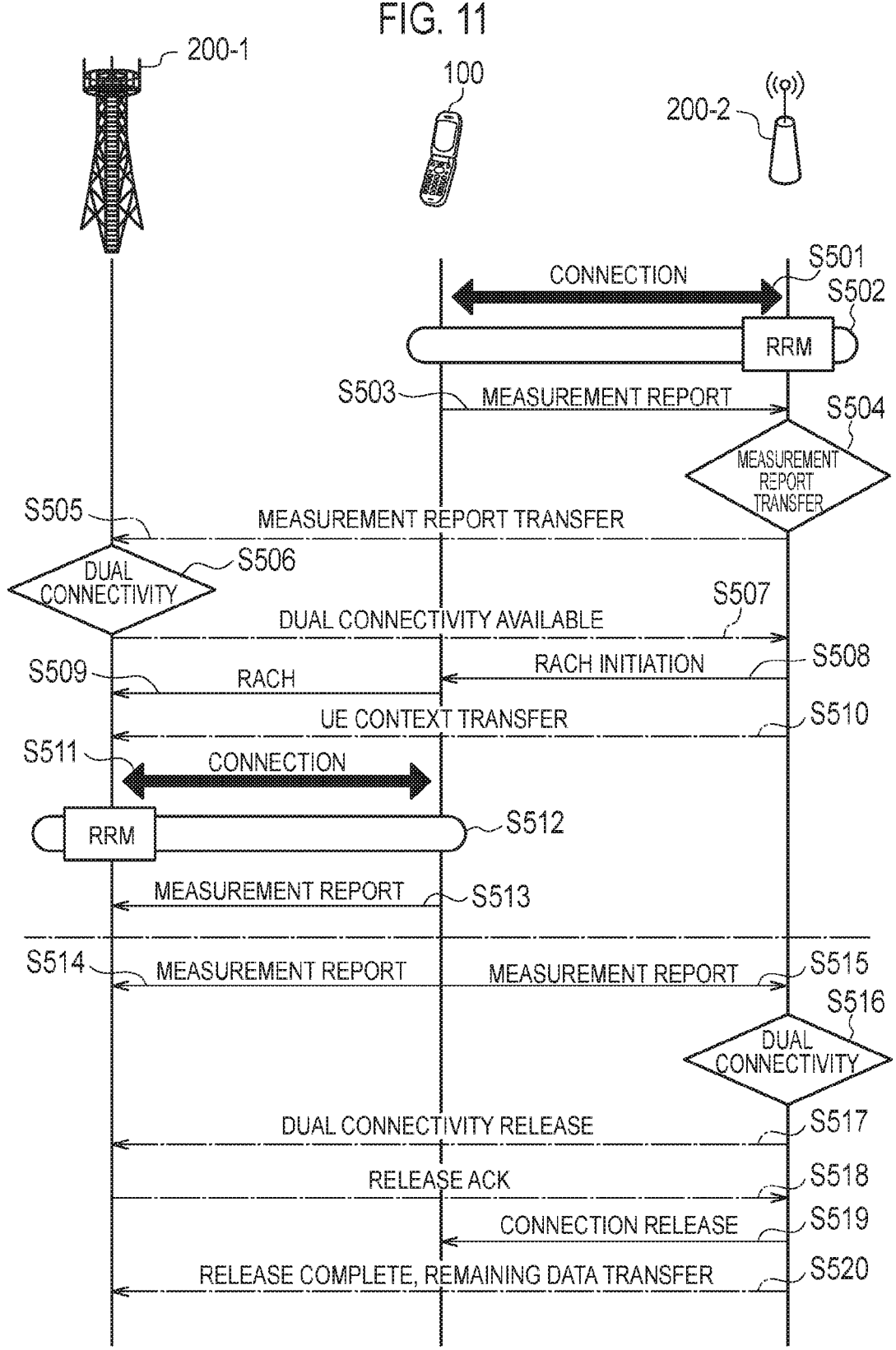
FIG. 11 is a sequence diagram of an operation pattern 2-2 according to the first embodiment.

FIG. 11 is a sequence diagram of an operation pattern 2-2 according to the first embodiment.

In the operation pattern 2-1, after the handover of the UE 100 from the eNB 200-2 to the eNB 200-1, the dual connectivity is started at the initiative of the eNB 200-1. In contrast, in the operation pattern 2-2, the dual connectivity is started at the initiative of the eNB 200-1, while the eNB 200-2 maintains the connection with the UE 100.

As illustrated in FIG. 11, processes in steps S501 to S507 are similar to those of the operation pattern 2-1. In step S507, along with the start notification (the Dual connectivity available), the eNB 200-1 transmits, to the eNB 200-2, information on a random access channel (RACH information) that should be used at the time of establishing a connection with the eNB 200-1.

In step S508, the eNB 200-2 transmits instruction information (RACH initiation), which is used by the UE 100 in order to establish the connection with the eNB 200-1, to the UE 100. Here, the eNB 200-2 transmits the RACH information received from the eNB 200-1 in the instruction information (the RACH initiation).

In step S509, the UE 100 performs a random access (RACH) process to the eNB 200-1 based on the instruction information (the RACH initiation) received from the eNB 200-2.

In step S510, the eNB 200-2 transmits, to the eNB 200-1, context information (a UE context) of the UE 100.

In step S511, the UE 100 establishes a connection (an RRC connection) with the eNB 200-1. As a result, the dual connectivity is started.

In step S512, the eNB 200-1 performs the RRM of the UE 100. Specifically, measurement for the mobility control of the UE 100 is controlled.

In step S513, the UE 100 transmits a measurement report to the eNB 200-1 under the control of the eNB 200-1. The measurement report includes each of measurement results of the serving cell of the UE 100 (the large cell) and a neighboring cell (the small cell).

Then, in step S514, the UE 100 transmits a measurement report (the first measurement report) to the eNB 200-1 under the control of the eNB 200-1. The first measurement report includes each of measurement results of the serving cell of the UE 100 (the large cell) and a neighboring cell (the small cell). That is, the first measurement report is used in the mobility control of the UE 100 in the eNB 200-1.

In step S515, the UE 100 transmits a measurement report (the second measurement report) to the eNB 200-2 under the control of the eNB 200-2. The second measurement report includes the measurement result of the cell of eNB 200-2 (the small cell). That is, the second measurement report is used in deciding whether or not to end the dual connectivity in the eNB 200-2.

In step S516, the eNB 200-2 decides whether or not to end the dual connectivity based on the second measurement report received from the UE 100. Subsequent processes are similar to those of the operation pattern 1-2.

Figure 12:
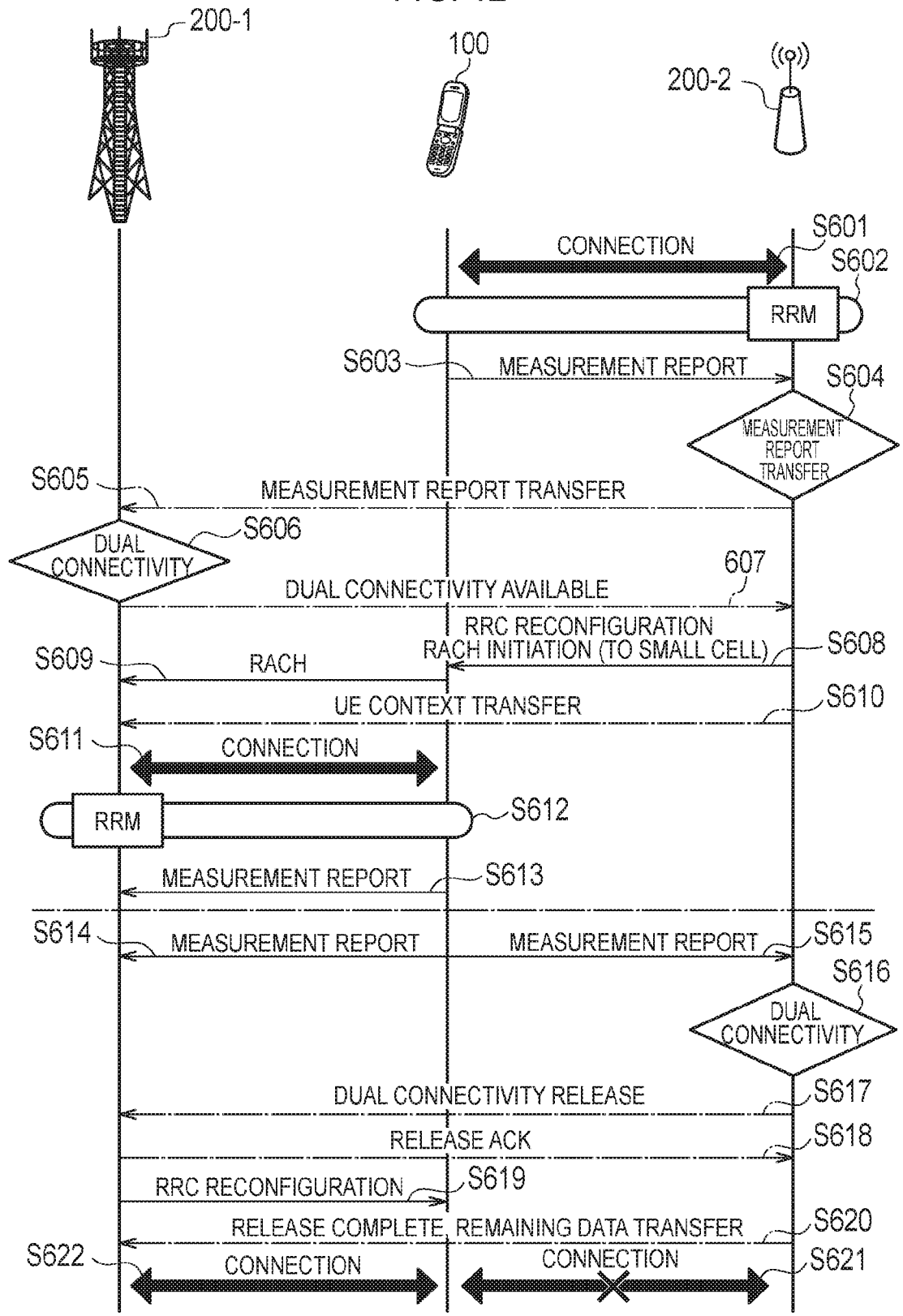
FIG. 12 is a sequence diagram of a modification of the operation pattern 2-2 according to the first embodiment.

FIG. 12 is a sequence diagram of a modification of the operation pattern 2-2 according to the first embodiment.

As illustrated in FIG. 12, after transmitting the positive response (the Release ACK) to the eNB 200-2, the eNB 200-1 transmits, to the UE 100, the release request (the RRC reconfiguration) of the second connection (step S619). Then, upon receiving the release request (the RRC reconfiguration) from the eNB 200-1, the UE 100 releases the second connection (step S621). The other operations are similar to those of the operation pattern 2-2.

Alternatively, the eNB 200-2 may release the second connection without inquiring (dual connectivity release) of the eNB 200-1. Specifically, the eNB 200-2 transmits, to the eNB 200-1, the release notification (the Release Complete) of the second connection after releasing the second connection, when deciding to end the dual connectivity based on the measurement report (the second measurement report) received from the UE 100. At this time, along with the release notification, the eNB 200-2 transmits, to the eNB 200-1, the data that the eNB 200-2 has not transmitted to the UE 100.

Alternatively, the eNB 200-2 transmits, to the eNB 200-1, the release decision notification (the Dual connectivity release) of the second connection without releasing the second connection, when deciding to end the dual connectivity based on the measurement report (the second measurement report) received from the UE 100. Upon receiving the release decision notification from the eNB 200-2, the eNB 200-1 transmits, to the UE 100, a release request (an RRC reconfiguration) of the second connection. Upon receiving the release request from the eNB 200-1, the UE 100 releases the second connection.

First Modification of First Embodiment

In the above-described first embodiment, the UE 100 during the dual connectivity transmits the measurement report to each of the eNB 200-1 and the eNB 200-2. It is preferable that the UE 100 during the dual connectivity transmits not only the measurement report but also feedback information, to each of the eNB 200-1 and the eNB 200-2.

The feedback information includes ACK/NACK, CSI (Channel State information) and the like. The CSI includes CQI (Channel Quality Indicator), PMI (Precoder Matrix Indicator), RI (Rank Indicator) and the like.

When the feedback information is transmitted to only one eNB of the eNB 200-1 and the eNB 200-2, a delay occurs at the time of transferring the feedback information from the one eNB to the other eNB. Thus, the UE 100 transmits the feedback information to each of the eNB 200-1 and the eNB 200-2, thereby it is possible to resolve such a problem.

Second Modification of First Embodiment

In the above-described first embodiment, the eNB 200-2 includes the information on a random access channel (RACH information) in the positive response (the ACK), at the time of transmitting, to the eNB 200-1, the positive response (the ACK) to the establishment request.

However, the eNB 200-2 may separately transmit the positive response (the ACK) and the information on a random access channel (RACH information), to the eNB 200-1.

Second Embodiment

The second embodiment will be described while focusing on the differences from the first embodiment.

Although the operation of the UE 100 in the connected state is described in the first embodiment, an operation of the UE 100 in an idle state will be described in the second embodiment. It is noted that an operation environment of the second embodiment is similar to that of the first embodiment (see FIG. 6).

When the UE 100 that supports a dual connectivity is in an idle state and is camping in the small cell, first of all, the UE 100 establishes connection with the small cell, and thus, the control of the dual connectivity becomes complicated. "Camping in the small cell" means selecting the small cell as a serving cell in the idle state. Thus, in the second embodiment, the UE 100 that supports a dual connectivity is controlled to camp in the large cell.

(a) Operation Pattern 1

In an operation pattern 1 according to the second embodiment, the eNB 200-2 that manages the small cell, transmits broadcast information for prohibiting the camping of the UE 100 that supports a dual connectivity, in a cell of the eNB 200-2 (the small cell). The broadcast information is information receivable in the UE 100 that is in the idle state.

Based on the broadcast information from the eNB 200-2, rather than camping in the cell of the eNB 200-2 (the small cell), the UE 100 that is in the idle state camps in a cell of the eNB 200-1 (the large cell).

Either of the following 1) or 2) is used as the broadcast information.

1) The broadcast information is information indicating a specific access class (AC), which is a target for access regulation.

A system information block type 2 (SIB 2), which is a type of the broadcast information, includes information indicating an access class for which the access to the transmission source cell is regulated. Meanwhile, SIM (Subscriber Identity Module) of the UE 100 includes information indicating the access class of the UE 100.

Thus, a specific access class (for example, AC 15) is assigned to the UE 100 that supports a dual connectivity. Further, the small cell transmits the broadcast information indicating that the specific access class (for example, AC 15) is the target for access regulation.

As a result, the UE 100 that supports a dual connectivity decides that the small cell is the target for the access regulation, that is, camping in the small cell is prohibited.

2) Alternatively, the broadcast information is information indicating an access regulation for the UE 100 conforming to a specific release that supports a dual connectivity.

A system information block type 1 (SIB 1), which is a type of the broadcast information, includes information indicating whether or not the access to the transmission source cell is being regulated (cellBarred). Meanwhile, the dual connectivity is scheduled to be introduced in a specific release of 3GPP (for example, Release 12), and the UE 100 recognizes a release to which the UE 100 is conformed.

Thus, the small cell transmits broadcast information (cell-Barred-r12) which is information applied to the UE 100 conforming to the specific release (for example, Release 12) and which indicates that the access is being regulated.

As a result, the UE 100 that supports a dual connectivity decides that the access to the small cell is being regulated, that is, camping in the small cell is prohibited.

(b) Operation Pattern 2

In an operation pattern 2 according to the second embodiment, the UE 100 that supports a dual connectivity is controlled to camp in the large cell by using, rather than the broadcast information for access regulation, a cell re-selection priority of the UE 100.

The eNB 200-1 that manages the large cell belonging to a first frequency transmits, to the UE 100, information for lowering a cell re-selection priority of a second frequency to which the small cell belongs (a Cell Reselection Priority). The eNB 200-1 transmits Cell Reselection Priority in a connection release message (an RRC Connection Release message), to the UE 100.

It is noted that the eNB 200-1 can recognize that the UE 100 supports a dual connectivity during the connection with the UE 100, and adjust Cell Reselection Priority for the UE 100. For example, the eNB 200-1 configures a Cell Reselection Priority corresponding to the second frequency to which the small cell belongs, to the lowest priority.

In an idle state, the UE 100 that supports a dual connectivity lowers the cell re-selection priority of the second frequency based on the Cell Reselection Priority received from the eNB 200-1. As a result, the UE 100 preferentially camps in the large cell than the small cell.

(c) Operation Pattern 3

In an operation pattern 3 according to the second embodiment, the UE 100 that supports a dual connectivity is controlled to autonomously connect with the large cell.

The UE 100 that is camping in the cell of the eNB 200-2 (the small cell) in an idle state establishes a connection with the eNB 200-1 after re-selecting a cell of the eNB 200-1 (the large cell), when starting communication in which a dual connectivity should be applied. Here, "communication in which a dual connectivity should be applied" means communication in which traffic (services) requiring high throughput is handled, and the like.

For example, when starting communication in which the dual connectivity should be applied, the UE 100 that is camping in the cell of the eNB 200-2 (the small cell) in an idle state autonomously adjusts the cell re-selection priority, thereby re-selecting the cell of the eNB 200-1 (the large cell). As a result, the UE 100 can camp in the large cell and connect with the large cell.

Other Embodiments

In each of the above-described embodiments, the capability of the UE 100 is not particularly mentioned. However, it is considered that a frequency band for which the UE 100 can use in a dual connectivity is restricted in accordance with the radio communication capability of the UE 100, because the UE 100 simultaneously uses different frequencies in the dual connectivity. Thus, it is preferable that the UE 100 that supports a dual connectivity transmits, to the eNB 200, capability information (UE Capability) indicating the frequency band for which the UE 100 can use in the dual connectivity. The eNB 200 determines whether to apply a dual connectivity to the UE 100 based on the capability information (the UE Capability). The eNB 200 may decide not to apply the dual connectivity to the UE 100, when the frequency of the cell of the eNB 200 does not match the frequency band indicated by the capability information (the UE Capability).

It is noted that cases where the present disclosure is applied to the LTE system are mainly described in the above-described embodiments. However, the present disclosure may also be applied to systems, other than the LTE system, as well as the LTE system.

First Modification of Second Embodiment

As described above, the dual connectivity scheme is a scheme by which a user terminal simultaneously establishes a connection with a plurality of cells managed by a different base station. It is noted that the dual connectivity scheme may be called an inter-base station carrier aggregation (inter-eNB CA).

In the dual connectivity scheme, among the plurality of cells that establish connection with the user terminal, only one cell (hereinafter, called "first cell") establishes an RRC connection with the user terminal That is, another cell of the plurality of cells (hereinafter, called "second cell") establishes a connection with the user terminal in a layer that is lower than an RRC layer, and does not establish an RRC connection with the user terminal In the dual connectivity scheme, a scenario in which the first cell is a macro cell, and the second cell is a cell that is smaller (a small cell) than the macro cell, is considered in most cases. The small cell has a coverage that overlaps at least a part of the coverage of the macro cell.

Thus, when starting the dual connectivity scheme after establishing an RRC connection with the small cell, a procedure in which the user terminal switches the RRC connection from the small cell to the macro cell is thought to be necessary. Therefore, a problem is seen where the processing for starting the dual connectivity scheme becomes complex.

Below, an embodiment for enabling an easy start of the dual connectivity scheme will be described.

(Cell Reselection)

The UE 100 in an RRC idle state (the idle state) performs cell reselection along with movement. The cell reselection is an operation of selecting a serving cell of the UE 100 in the RRC idle state. In the RRC idle state, the serving cell may be called a standby cell or a camping-destination cell.

The cell evaluation method during cell reselection is described in 3GPP Technical Specification "TS 36.304", however, an outline of the same is presented below. In cell reselection, a basic concept of selecting the cell with the highest received power (best cell principle) is employed. Furthermore, because of the fact that a frequency with a high priority is always set as a measurement target at the time of a cell search, and the fact that as the priority increases, the cell transfer conditions are alleviated, a state in which it is easy to select the frequency with a high priority is realized.

Specifically, the UE 100 in the RRC idle state performs either of the following operations depending on the magnitude correlation between the frequency priority of a camping cell (a serving cell) and the frequency priority of a cell that performs reselection evaluation (an evaluated cell).

1) When the "frequency priority of the evaluated cell>frequency priority of the serving cell": the UE 100 moves to the evaluated cell, that is, the UE 100 reselects the evaluated cell as a serving cell if the received power of the evaluated cell is higher than a threshold value continuously for a certain period of time.

2) When the "frequency priority of the evaluated cell<frequency priority of the serving cell": the UE 100 does not perform evaluation for the evaluated cell arranged in that frequency if the received power of the serving cell is equal to or more than the threshold value. If the received power of the serving cell is equal to or less than the threshold value, the UE 100 performs the same operation as in 1).

It is noted that if the evaluated cell is a special cell, the UE 100 does not apply the above-mentioned operations depending on each situation. A "special cell" is a cell that delivers a CSG cell and MBMS, for example, and the "situation" indicates a case when the UE 100 is a member of the CSG, or has an interest in the MBMS.

In this way, an appropriate cell is reselected as the serving cell. Also, when shifting from the RRC idle state to the RRC connected state, the UE 100 performs a random access procedure for the selected serving cell. Through the random access procedure, the UE 100 establishes an RRC connection with the serving cell.

(Dual Connectivity Scheme)

The LTE system according to the first embodiment supports a dual connectivity scheme. The dual connectivity scheme is expected to be introduced in Release 12 and thereafter.

The dual connectivity scheme is a scheme by which the UE 100 in the RRC connected state simultaneously establishes a connection with a plurality of cells managed by the different eNB 200. It is noted that the dual connectivity scheme is called an inter-base station carrier aggregation (inter-eNB CA).

In the dual connectivity scheme, of the plurality of cells that establish a connection with the UE 100, only one cell (one eNB 200) establishes an RRC connection with the UE 100. That is, the other cell of the plurality of cells (the other eNB 200) establishes a connection with the UE 100 in a layer that is lower than the RRC layer, and does not establish an RRC connection with the UE 100.

Hereinafter, in the dual connectivity scheme, a cell (the eNB 200) that establishes an RRC connection with the UE 100 is called a master cell (master eNB). Moreover, in the dual connectivity scheme, one or a plurality of cells (the eNB 200) that establish a connection with the UE 100 in a layer that is lower than the RRC layer are called secondary cells (secondary eNBs).

The master eNB performs the processing of the RRC layer, for example, a mobility control (Mobility management) of the UE 100. The mobility control implies a handover control and the like. Each of the master eNB and the secondary eNB performs scheduling for one UE 100, and assigns a radio resource to the one UE 100. Because a radio resource is assigned to the UE 100 from each eNB, an improvement in throughput can be expected.

Operation According to First Modification

In the dual connectivity scheme, a scenario in which the master cell is a macro cell, and the secondary cell is a cell that is smaller (a small cell) than the macro cell, is considered in most cases. The small cell is a pico cell, a femto cell and the like, for example, and is arranged within the coverage of the macro cell. In the first modification, the macro cell corresponds to the first cell, and the small cell corresponds to the second cell.

In this way, by setting a cell having a wide coverage as the master cell, it becomes possible to support the movement of the UE 100 in an RRC connected state, that is, it becomes possible to strengthen mobility. Specifically, when the UE 100 that communicates according to the dual connectivity scheme establishes an RRC connection with a small cell, along with the movement of the UE 100, it becomes necessary to perform processing (a handover and the like) for switching the RRC connection to a macro cell.

Therefore, in the first modification, in order to avoid the possibility of a handover from the small cell to the macro cell, a case in which the master cell is restricted to a macro cell, and the secondary cell is restricted to a small cell is assumed.

In the first modification, the UE 100 that supports the dual connectivity scheme and is in an RRC idle state performs a cell reselection control to select the macro cell as the serving cell rather than selecting the small cell as the serving cell. Thus, the UE 100 first establishes an RRC connection with the macro cell. Thus, in a case where the master cell is restricted to a macro cell and the secondary cell is restricted to a small cell, the UE 100 that supports the dual connectivity scheme can easily start the communication according to the dual connectivity scheme.

Figure 13:
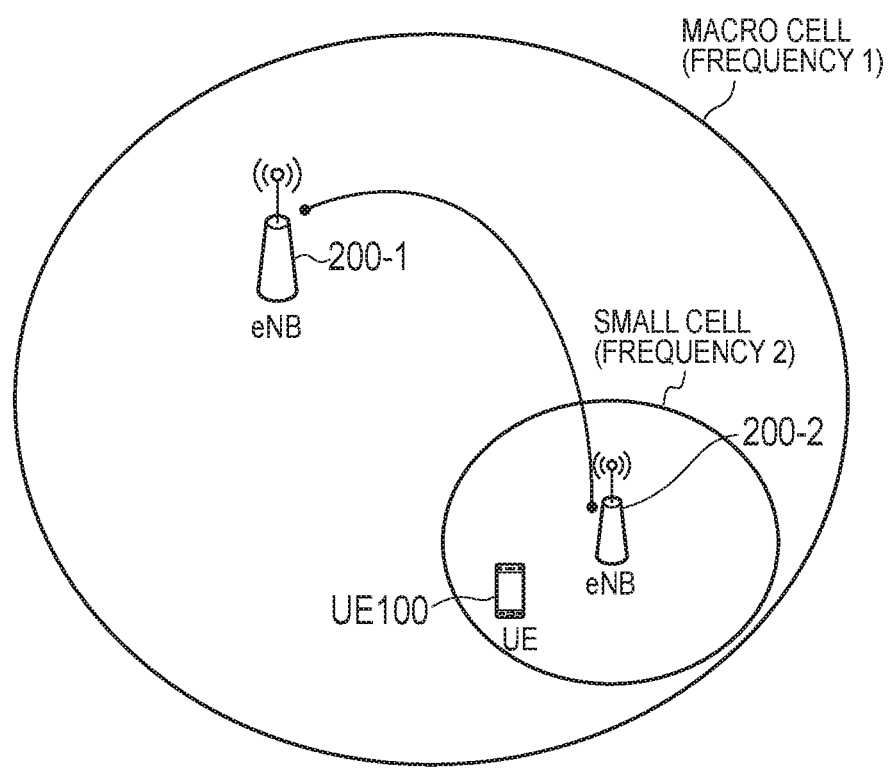
FIG. 13 is a diagram illustrating an operation environment according to a first modification of the second embodiment.

FIG. 13 is a diagram illustrating an operation environment according to the first modification.

As illustrated in FIG. 13, eNB 200-1 manages a macro cell belonging to frequency 1 (a first frequency). eNB 200-2 manages a small cell belonging to frequency 2 (a second frequency) that is different from the frequency 1. The eNB 200-1 and the eNB 200-2 are mutually connected through a backhaul interface (for example, the X2 interface). The small cell has a coverage that overlaps at least a part of the coverage of the macro cell. The UE 100 is positioned within an area where the coverage of the macro cell overlaps the coverage of the small cell. The UE 100 conforms to the specifications of Release 12 and thereafter, and supports the dual connectivity scheme.

In the first modification, the eNB 200-1 transmits the control information used in the cell reselection control to the UE 100 either in a unicast manner or a broadcast manner. The control information is information (Cell Reselection Priority) for relatively reducing the priority of the frequency 2 in cell reselection in comparison with the priority of the frequency 1. For example, the eNB 200-1 transmits the control information for the setting frequency 2 to which the small cell belongs to the least priority. Specifically, according to the specifications, since it is possible to set the priority in eight stages of 0 to 7 for each frequency, the eNB 200-1 transmits the control information for the setting frequency 2 to the least priority from among the eight stages. Alternatively, in addition to the 0 to 7 stages, the control information may be transmitted by adding a flag (a new one bit) indicating that the frequency 2 has the least priority. Or, rather than setting the frequency 2 to the least priority, the control information for setting the frequency 1 to which the macro cell belongs to a particular frequency, and setting the frequency 2 to which the small cell belongs to a priority that is lower than the priority of the frequency 1, may be transmitted.

The UE 100 that receives the control information performs cell reselection control on the basis of the received control information. As a result of the control information, the priority of the frequency 1 to which the small cell belongs becomes lower than the priority of the frequency 1 to which the macro cell belongs. As described above, the UE 100 always sets a frequency with a high priority as a measurement target at the time of a cell search, and as the priority increases, the cell transfer conditions are alleviated, and the UE 100 can select the macro cell as the serving cell.

It is noted that the control information need not necessarily be transmitted by the eNB 200-1, and the control information can also be transmitted by the eNB 200-2 in a broadcast manner. The control information that is broadcast can also be received by the UE 100 that is in an RRC idle state.

Furthermore, it is preferable for UE that does not support the dual connectivity scheme to not receive the control information, or to discard the control information even if the control information is received.

Figure 14:
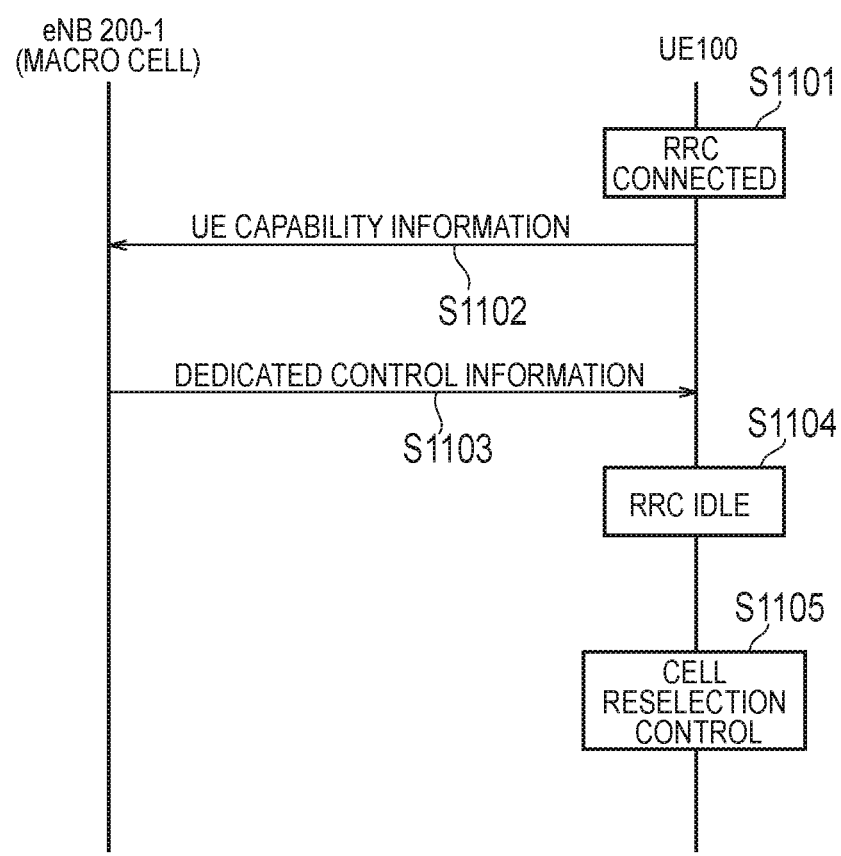
FIG. 14 is a sequence diagram illustrating an operation sequence according to the first modification of the second embodiment.

FIG. 14 is a sequence diagram illustrating an operation sequence according to the first modification. A case in which the eNB 200-1 transmits the control information used in the cell reselection control in a unicast manner is described below. Hereinafter, the control information transmitted in the unicast manner is called dedicated control information. The dedicated control information can be received only by the UE 100 that is in an RRC connected state.

As illustrated in FIG. 14, in step S1101, the UE 100 establishes an RRC connection with the eNB 200-1 (the macro cell), and shifts to the RRC connected state.

In step S1102, the UE 100 notifies, to the eNB 200-1, UE capability information indicating that the UE 100 supports the dual connectivity scheme. As long as the UE capability information is information that can indicate that the UE 100 supports the dual connectivity scheme, the UE capability information could be information about the Release (for example, Release 12) to which the UE 100 conforms, for example.

In step S1103, on the basis of the UE capability information, the eNB 200-1 transmits, to the UE 100, the dedicated control information (Cell Reselection Priority) used in cell reselection control. The eNB 200-1 transmits the dedicated control information to the UE 100 through an RRC message. For example, the eNB 200-1 includes the dedicated control information in an RRC connection release request message, which is a type of an RRC message.

In step S1104, the UE 100 that receives the dedicated control information releases the RRC connection established with the eNB 200-1, and shifts to the RRC idle state.

In step S1105, the UE 100 that has shifted to the RRC idle state performs cell reselection control on the basis of the dedicated control information.

Thus, according to the first modification, in a case where a macro cell and a small cell belong to different frequencies, by setting the cell reselection priority of the frequency 2 to which the small cell belongs lower than that of the frequency 1 to which the macro cell belongs, the UE 100 that is in an RRC idle state can select the macro cell as the serving cell rather than selecting the small cell as the serving cell.

Second Modification of Second Embodiment

Hereinafter, the second modification will be described while focusing on differences from the first modification. A system configuration and an operation environment according to the second modification are the same as those in the first modification. However, in the second modification, the frequency to which the macro cell belongs and the frequency to which the small cell belongs may be the same frequency.

In the second modification, the eNB 200-2 (the small cell) transmits the control information used in the cell reselection control in a broadcast manner. Hereinafter, the control information transmitted in the broadcast manner is called broadcast control information. The broadcast control information can be received by the UE 100 that is in an RRC idle state and also by the UE 100 that is in an RRC connected state.

The broadcast control information according to the second modification is information indicating an access restriction on the UE 100 that supports the dual connectivity scheme. The UE 100 that receives the broadcast control information performs cell reselection control on the basis of the broadcast control information. Note that it is preferable for the UE that does not support the dual connectivity scheme to not receive the control information, or to discard the control information even if the control information is received.

For example, the eNB 200-2 transmits the broadcast control information as a new information element of a system information block type 1 (SIB 1), which is a type of system information. It is preferable for the new information element to be specified as an information element of Release 12 or thereafter so as to be applicable only in the UE 100 that supports the dual connectivity scheme. A configuration example of a new information element is described below.

```
SystemInformationBlockType1-v12-IEs ::= SEQUENCE {
cellBarred         ENUMERATED {barred, notBarred},
}
```

Here, the information element "cellBarred" is set to either "barred" that indicates that the transmission-source cell is under an access restriction, or to "notbarred" that indicates that the transmission-source cell is not under an access restriction. When "cellBarred" is set to "barred", the UE 100 that is in the RRC idle state performs control so as not to select the cell as the serving cell.

However, it is preferable for the UE 100 to be able to use the small cell as a secondary cell after the UE 100 has established an RRC connection with the macro cell. Thus, after establishing an RRC connection with the macro cell, if the UE 100 is controlled from the macro cell to establish a connection with the small cell so as to conform to the dual connectivity scheme, the UE 100 performs the processing for establishing a connection with the small cell regardless of the access restriction. That is, when the procedure for adding the small cell as the secondary cell is started, the UE 100 ignores "cellBarred" and performs a random access for the small cell.

Figure 15:
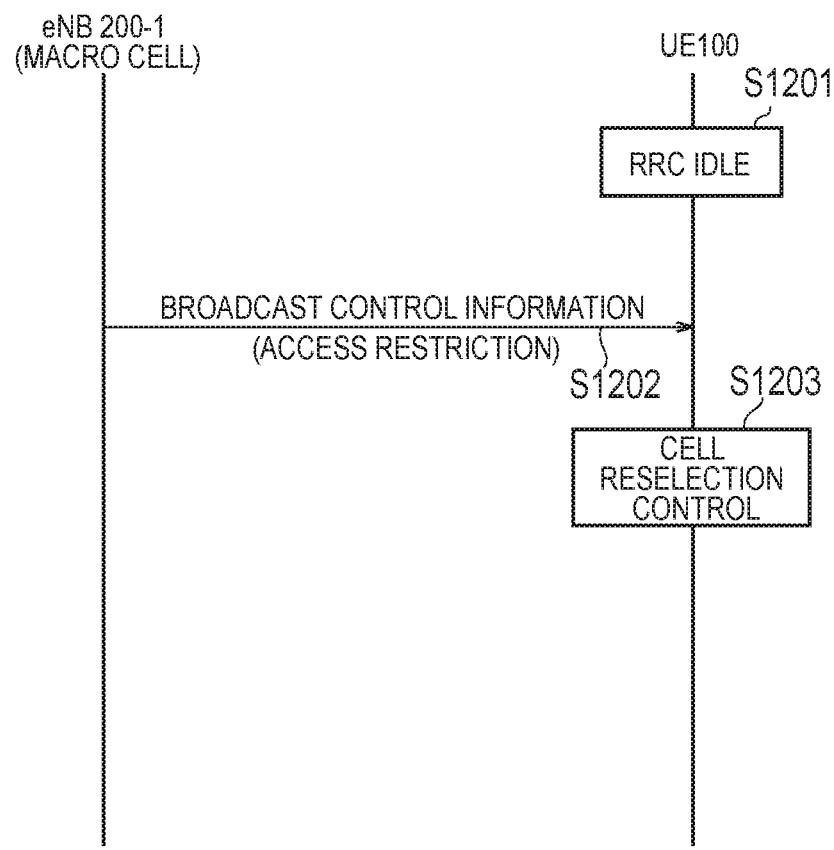
FIG. 15 is a sequence diagram illustrating an operation sequence according to a second modification of the second embodiment.

FIG. 15 is a sequence diagram illustrating an operation sequence according to the second modification.

As illustrated in FIG. 15, in step S1201, the UE 100 shifts to the RRC idle state.

In step S1202, the UE 100 in the RRC idle state receives, from the eNB 200-2 (the small cell), the broadcast control information indicating an access restriction on the UE 100 that supports the dual connectivity scheme.

In step S1203, the UE 100 that receives the broadcast control information performs cell reselection control on the basis of the received broadcast control information. Specifically, the UE 100 in the RRC idle state determines that the transmission-source cell (the small cell) of the broadcast control information is under an access restriction, and performs control so as not to select the cell as the serving cell.

Thus, according to the second modification, even in a case where a macro cell and a small cell belong to the same frequency, the UE 100 that is in an RRC idle state can select the macro cell as the serving cell rather than selecting the small cell as the serving cell.

Third Modification of Second Embodiment

Hereinafter, the third modification will be described while focusing on the differences from the first and the second modifications. A system configuration and an operation environment according to the third modification are the same as those in the first modification. However, in the third modification, the frequency to which the macro cell belongs and the frequency to which the small cell belongs may be the same frequency.

In the third modification, the UE 100 acquires, from a network (the E-UTRAN 10 or the EPC 20), a list (hereinafter, "small cell list") that includes an identifier of the small cell. The UE 100 in the RRC idle state performs cell reselection control on the basis of the small cell list. The identifier of the small cell is a physical cell identifier (PCI) of the small cell, for example The UE 100 identifies the PCI of the cell on the basis of the synchronization signal received from the cell, and determines the cell corresponding to the PCI included in the small cell list as the small cell. The identifier of the small cell could be a Global eNB ID, an eNB ID, ECGI, and ECI, an operating frequency (ERFCN) and the like.

The UE 100 in the RRC idle state performs cell reselection control to prohibit the selection of the small cell as a serving cell.

Alternatively, the UE 100 in the RRC idle state performs cell reselection control to relatively reduce the priority of the small cell in cell reselection. For example, applying a negative offset to the received power of the small cell, or applying a positive (or negative) offset to the threshold value comparable to the received power of the small cell, in the cell evaluation of cell reselection. These offset values may be included in the broadcast control information from the network.

Figure 16:
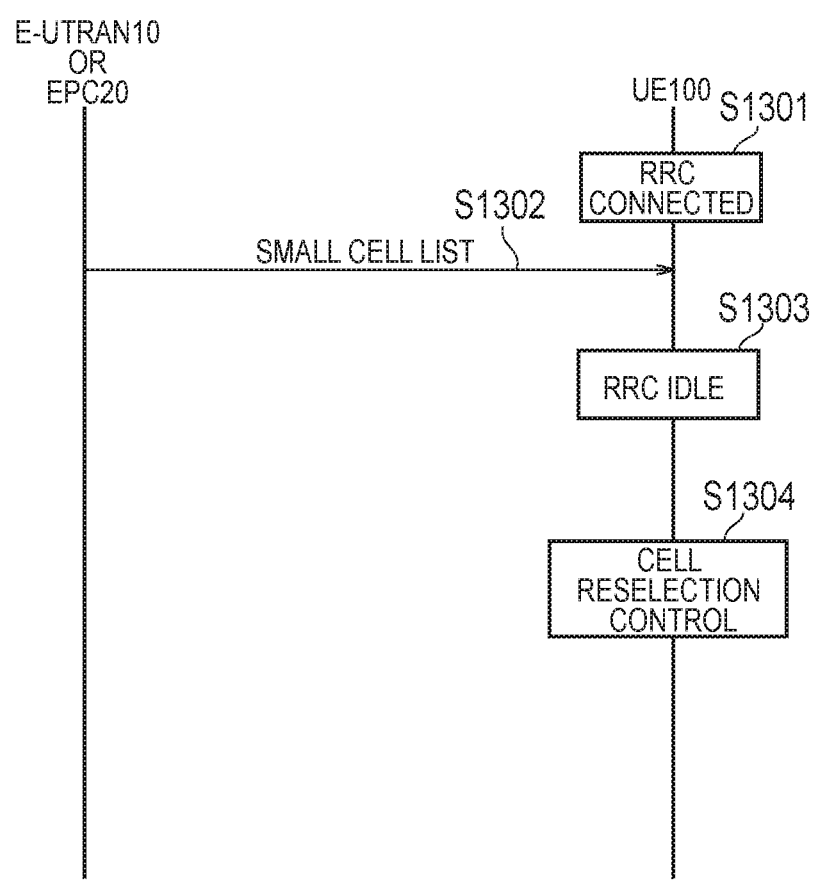
FIG. 16 is a sequence diagram illustrating an operation sequence according to a third modification of the second embodiment.

FIG. 16 is a sequence diagram illustrating an operation sequence according to the third modification.

As illustrated in FIG. 16, in step S301, the UE 100 shifts to the RRC connected state.

In step S1302, the UE 100 acquires a small cell list from the network (the E-UTRAN 10 or the EPC 20). The small cell list may be included in an RRC message, or may be included in an NAS message.

In step S1303, the UE 100 shifts to the RRC idle state.

In step S1304, the UE 100 that has shifted to the RRC idle state performs cell reselection control on the basis of the small cell list.

Thus, according to the third modification, even in a case where a macro cell and a small cell belong to the same frequency, the UE 100 that is in an RRC idle state can select the macro cell as the serving cell rather than selecting the small cell as the serving cell.

Fourth Modification

Hereinafter, the fourth modification will be described while focusing on the differences from the first modification to the third modification. A system configuration and an operation environment according to the fourth modification are the same as those in the first modification. However, in the fourth modification, the frequency to which the macro cell belongs and the frequency to which the small cell belongs may be the same frequency.

In the fourth modification, the eNB 200-2 (the small cell) transmits the control information used in the cell reselection control in a broadcast manner. The broadcast control information can be received by the UE 100 that is in an RRC idle state and also by the UE 100 that is in an RRC connected state.

The broadcast control information according to the fourth modification is information indicating a cell type of a transmission-source cell of the broadcast control information. The UE 100 performs cell reselection control on the basis of the broadcast control information.

For example, the eNB 200-2 transmits the broadcast control information as a new information element of a system information block type 1 (SIB 1), which is a type of system information. It is preferable for the new information element to be specified as an information element of Release 12 or thereafter so as to be applicable only in the UE 100 that supports the dual connectivity scheme. A configuration example of a new information element is described below.

SystemInformationBlockType1-v12-IEs::=SEQUENCE
{CellTypeIndication ENUMERATED {SmallCell, nonSmallCell}, }

Here, the information element "CellTypeIndication" is set to either "SmallCell" that indicates that the transmission-source cell is a small cell, or to "nonSmallCell" that indicates that the transmission-source cell is not a small cell. When "CellTypeIndication" is set to "SmallCell", the UE 100 that is in the RRC idle state performs control so as not to select the cell as the serving cell.

For example, the UE 100 in the RRC idle state performs cell reselection control to prohibit the selection of the small cell as a serving cell.

Alternatively, the UE 100 in the RRC idle state performs cell reselection control to relatively reduce the priority of the small cell in cell reselection. For example, applying a negative offset to the received power of the small cell, or applying a positive (or negative) offset to the threshold value comparable to the received power of the small cell, in the cell evaluation of cell reselection. These offset values may be included in the broadcast control information from the network.

Figure 17:
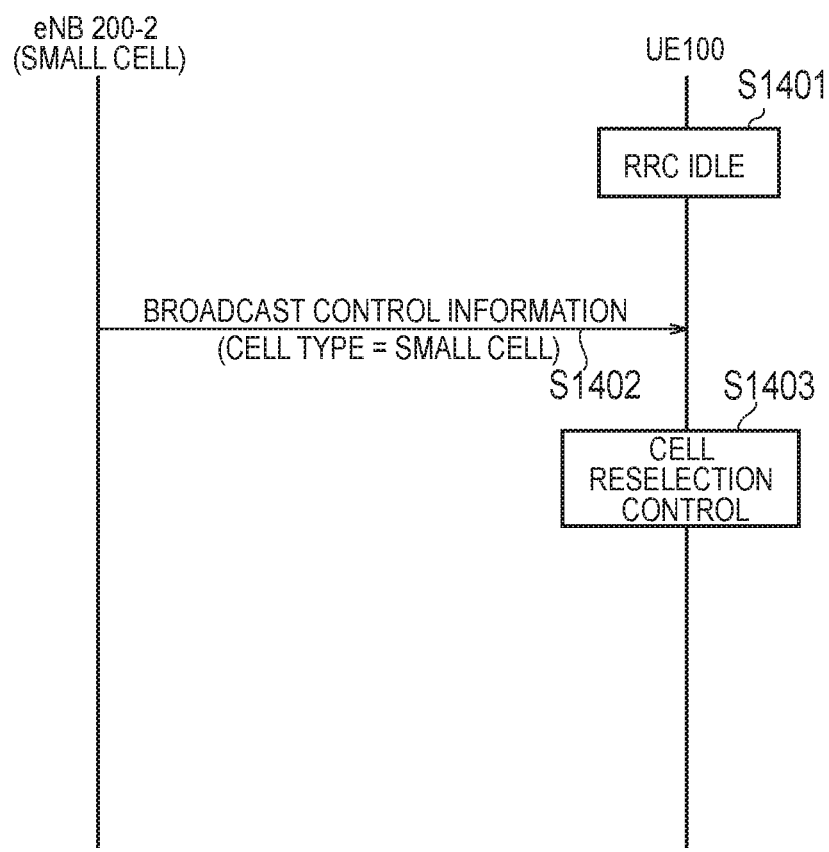
FIG. 17 is a sequence diagram illustrating an operation sequence according to a fourth modification of the second embodiment.

FIG. 17 is a sequence diagram illustrating an operation sequence according to the fourth modification.

As illustrated in FIG. 17, in step S1401, the UE 100 shifts to the RRC idle state.

In step S1402, the UE 100 in the RRC idle state receives, from the eNB 200-2 (the small cell), the broadcast control information indicating the cell type of the transmission-source cell.

In step S1403, the UE 100 that receives the broadcast control information performs cell reselection control on the basis of the received broadcast control information.

Thus, according to the fourth modification, even in a case where a macro cell and a small cell belong to the same frequency, the UE 100 that is in an RRC idle state can select the macro cell as the serving cell rather than selecting the small cell as the serving cell.

Other Embodiments

In the above-described third and fourth modifications, the UE 100 may recognize the small cell, and may perform cell reselection control in consideration of the status of the two cells. For example, the UE 100 selects the small cell when a signal strength of the camped macro cell falls below the threshold value, and a signal strength of the small cell rises above the threshold value. Alternatively, the UE 100 selects the macro cell when the signal strength of the camped small cell falls below the threshold value, and the signal strength of the macro cell rises above the threshold value.

In the above-described second modification to the fourth modification, a case in which the macro cell and the small cell were provided in the same frequency for dealt with, however, in an environment where the macro cell and the small cell are provided in the same frequency, and the system supports only that frequency, the fact that access to the small cell is prohibited is not preferred. Thus, in such an environment, a non-transmission interval may be set in the small cell using ABS (Almost Blank Subframe) and the like, and the UE 100 may perform control so as to evaluate the macro cell in the non-transmission interval.

Figure 18:
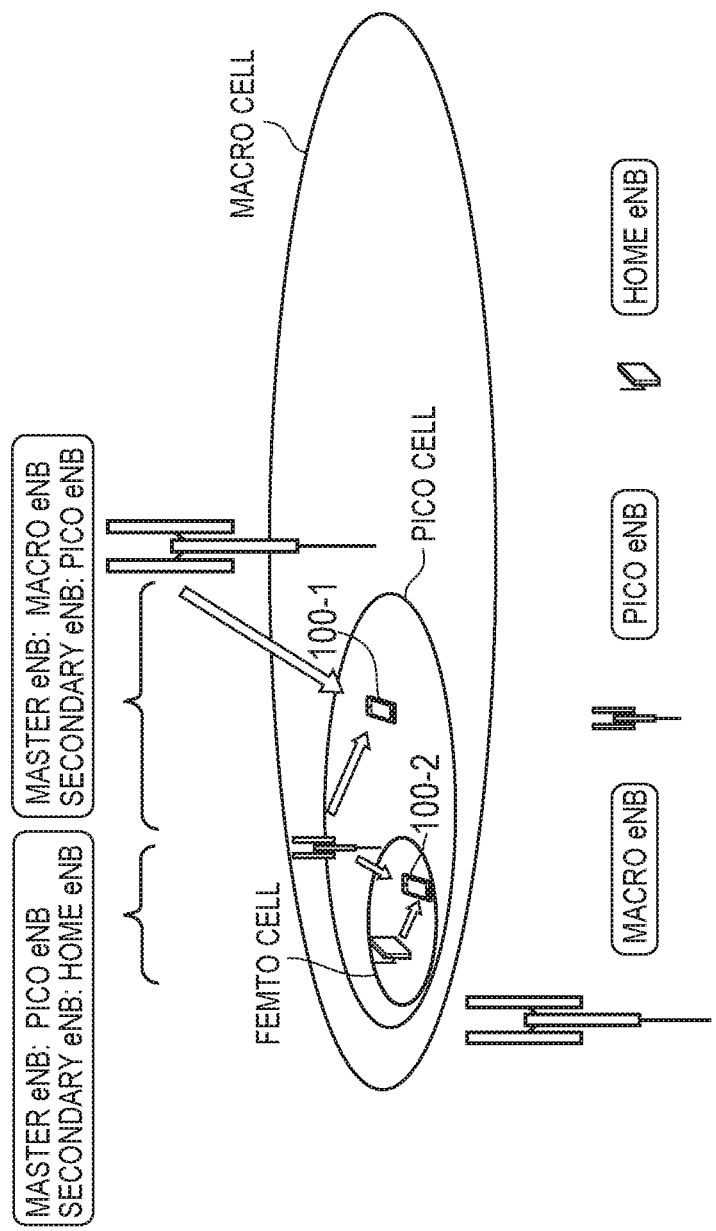
FIG. 18 is a diagram illustrating an operation environment according to other embodiments.

In the above-described first modification to the fourth modification, a case in which the first cell is a macro cell and the second cell is a small cell was illustrated. However, the present disclosure is not limited to such a combination, and the first cell may be a pico cell (or a macro cell), and the second cell may be a femto cell. FIG. 18 is a diagram illustrating an operation environment according to another modification. As illustrated in FIG. 18, UE 100-1 sets a macro cell (a macro eNB) as a master cell (a master eNB), and a pico cell (a pico eNB) as a secondary cell (a secondary eNB). UE 100-2 sets a pico cell (a pico eNB) as a master cell (a master eNB), and a femto cell (a home eNB) as a secondary cell (a secondary eNB).

In the above-described modifications, as one example of the mobile communication system, the LTE system is described. However, the present disclosure is not limited to the LTE system, and the present disclosure may be applied to systems other than the LTE system.

[Additional Statement 1]

Below, additional statements for above-described embodiments will be described.

(Necessity for Dual Connectivity)

Both mobility robustness and capacity/user throughput improvement in hotspot areas using low-power nodes are needed. One of the most important missions for improved user experience has been the enhancement of capacity and user throughput. The possibility of utilizing resources from more than one eNB is considered to further improve capacity and user throughput. However, the two expected challenges listed below must be resolved:

b) Difficult to improve system capacity by utilizing radio resources in more than one eNB (e.g. due to UL/DL imbalance issues)

d) Difficult to improve per-user throughput by utilizing radio resources in more than one eNB Regarding b), a primary cause of UL/DL power imbalance is different Tx power between macro and small cells. There is an UL/DL power imbalance for co-channel HetNet deployment scenario. It would be beneficial to explore other solutions that could provide additional benefits such as throughput gains compared to the solution introduced in previous release.

Regarding d), although CA and CoMP solutions are already developed, some limitations still exist. Rel-10/11 CA can only allow the aggregation of cells served by the same eNB and Rel-11 CoMP can only allow inter-eNB coordination with ideal backhaul. There is currently no existing mechanism that allows the UE to be simultaneously served by two non-co-channel cells belonging to different eNBs and by co-channel cells connected through non-ideal backhaul. To improve user experience with more useable bandwidths, CA over multiple eNB with non-ideal backhaul should be considered for Rel-12 small cell enhancements. To achieve this goal, the architecture that allows the UE to have dual connection with both the macro cell and the small cell (i.e., non-co-channel dual connectivity) should be adopted.

Proposal 1: non-co-channel dual connectivity architecture in Small Cell enhancements SI should be adopted.

(Design of Non-Co-Channel Dual Connectivity)

Dual Connectivity Complexities

The complexities to support the use of dual connectivity for the non-co-channel scenario are considered. Macrocell and small cell are connected via non-ideal backhaul. This implies larger backhaul latency can be assumed. With higher backhaul latency, it may be necessary for each small cell to have its own scheduler. In order to support dual connectivity, the additional complexities to coordinate the schedulers between the two cells must be carefully considered, i.e., whether the benefit for increased user experience justifies the increased complexity.

Additionally, the complexity of traffic splitting should be considered. One of the typical use cases for traffic splitting is when the UE is simultaneously running a VoIP call and a data application. If the data application is offloaded to the small cell while the VoIP call remains in the macrocell, this traffic splitting based on QoS has the potential to improve both the user experience and provide more resources to the macrocell. Splitting the traffic across more than two cells is already allowed in the current architecture for Rel-10/11 CA and CoMP operation, but splitting traffic across multiple eNBs isn't allowed in the current architecture. Therefore, splitting the traffic across two eNBs should be considered as one of the main objectives in this SI.

In order to support non-co-channel dual connectivity, it should take the following issues into account.

Back haul latency

Coordination of schedulers between macrocell and small cell

Traffic splitting over multiple eNBs (Anchor Cell and Booster Cell for Dual Connectivity)

In CA, the Type 4 scenario with RRHs appears to have the basic tools needed to support dual connectivity since the UE is simultaneously connected to the macrocell and the small cell (RRH). Although Type 4 CA does not address the general case where the small cells are not RRHs, it should be considered as a reference design for non-co-channel dual connectivity. One of the intrinsic characteristics of CA is that the SCell candidate is pre-defined since only CCs operated by one eNB can be aggregated. The pre-defined SCell candidate concept should be carried over to dual connectivity since not every small cell will be a good candidate for dual connectivity. The small cell has to be within coverage of the UE and also meet the requirements of backhaul delay from network implementation perspective. Another concept that can be borrowed from CA is the procedure for SCell addition and removal. This can be done without performing a handover. Handover is only performed when the PCell changes. Again, this concept should also be reused for dual connectivity. Another important concern is the suitability of a small cell as PCell. In the case where a large number of small cells are deployed in a given area, a large number of handovers may occur which will lead to excessive signaling load and reduced mobility robustness. With this in mind, we should introduce the concept of an anchor cell, where the relationship between the anchor cell and the booster cell is pre-defined. In particular, only the macrocell should be an anchor under dual connectivity. Meanwhile, the small cell is always the booster cell. With this concept, excessive signaling can be avoided since transition from one small cell to another under the same anchor cell does not require a handover procedure.

Proposal 2: Cell combination candidates for dual connectivity should be pre-defined.

Proposal 3: the anchor cell concept, where the relationship between the anchor cell and the booster cell is pre-defined should be introduced.

If Proposal 3 is agreed and we apply the CA concept for SCell addition and removal for dual connectivity (i.e., booster cell addition and removal), the indication of booster cell's addition/removal always comes from anchor cell. Even if the UE is only connected to the booster cell, and the booster cell has the capability to send such an indication, it would be necessary for the small cell to handover the UE to the anchor cell before entering dual connectivity operation since the anchor cell should manage the UE's mobility. Therefore, it will not be necessary for the small cell to initiate dual connectivity. Regarding traffic splitting, different alternative for traffic splitting architectures have been suggested and it will be necessary to evaluate the pros and cons of the candidate solutions. However, regardless of which architecture solution is ultimately selected, we believe that one of the main objectives for any suitable architecture is to determine which entity decides the traffic splitting between the anchor cell and the booster cell. We think it's straightforward for the anchor cell to decide on the traffic splitting since it's assumed the traffic served by booster cell should be forwarded via anchor cell.

Proposal 4: Anchor cell should have the responsibility for traffic splitting and the initiation of dual connectivity by sending an indication of dual-connectivity to the UE.

As we mentioned in the previous paragraph, higher backhaul latency between anchor cell and booster cell should be taken into account. To improve RRM under dual connectivity, the UE should report CSI to the individual cells separately; otherwise the booster cell's scheduling performance will be degraded due to unreliable CSI feedbacks. For further enhancement, the UE could send the booster cell's DL CQI to the anchor cell for to maintain dual connectivity, since the booster cell's backhaul delay may be excessive. The rate at which UE sends this booster cell's CQI report to the anchor cell can be determined by NW implementation. For example, a UE may report booster cell's CQI every 5 ms. However, the UE may also send a booster cell's CQI report to the anchor cell every 20 ms (every 4th report). This report can piggyback on the anchor cell's CQI report.

Proposal 5: UE should separately report CSI to the individual cells. It is FFS whether the UE should also send the booster cell's CQI report to the anchor cell.

[Additional Statement 2]
(Mobility Anchor for Option C1)
Non-Co-Channel Case (Scenario 2)

If Option C1 is applied to inter-frequency dual-connectivity architecture, UE and Network have only one RRC entity which is similar to the CA architecture. We should try to reuse the current CA procedure as much as possible for option C1. However, one clear difference between inter-frequency dual-connectivity and CA architecture is the potential need to define a mobility anchor for dual-connectivity. For dual-connectivity, the MeNB (Master eNB) should always have a responsibility for mobility management. This reduces the signaling load by reducing the necessity for frequent handovers between neighbouring SeNBs (Secondary eNBs) within coverage of the same MeNB. In contrast, for CA, PCell always has the responsibility for mobility management. Since both MeNB and SeNB can be candidates for PCell, any eNB is potentially capable of providing mobility responsibility for the UE.

Proposal 1: For scenario 2, if Option C1 is adopted, dual-connectivity should reuse CA as much as possible with the exception that a mobility anchor should only be defined for MeNB.

Co-Channel Case (Scenario 1)

Considering the already agreed challenges for increased signaling load and difficulty with increasing per-UE throughput, dual-connectivity should also be applied to the co-channel case (Scenario 1). In particular, one potential benefit of dual-connectivity operation is the reduction of signaling due to the decreased number of context transfers; therefore, dual connectivity is also useful for Scenario 1. If introducing dual-connectivity operation in the co-channel case is decided, a unified architecture between Scenario 1 and Scenario 2 would be preferable. For Scenario 1, dual-connectivity is particularly attractive for handling issues with UL/DL power imbalance in the CRE region. However, if the UE is in the centre of SeNB, the UE will no longer have a direct Uu interface with the MeNB. Instead, the UE will only be connected to the SeNB. And we agree that one way to limit the amount of context transfer is to allow the MeNB to act as a mobility anchor and retain the UE's context information even when the UE is no longer connected with the MeNB. The MeNB would have the option to send RRC messages to the UE via the SeNB's Uu interface. But since there are still many open issues, we should further evaluate whether it is appropriate to keep the CA architecture functionalities for Option C1.

Proposal 2: For Scenario 1, if Option C1 is adopted, dual-connectivity should also reuse CA as much as possible with the exception that a mobility anchor be adopted only for MeNB.

(Considerations for Option C2)

In contrast to Option C1, Option C2 allows the UE to have direct RRC connection with both MeNB and SeNB. Although Option C2 is a bigger departure from intra-eNB CA, it may offer benefits in mobility management that should not be ignored.

Potential Benefit of Option C2
RLF

With CA, if the UE experiences RLF with the PCell then the UE shall initiate the reestablishment procedure assuming a suitable cell can be found. The UE shall also release the SCell(s) before initiating the reestablishment procedure. There really isn't any viable option since the UE has no RRC connection with the SCell. If dual-connectivity follows the same procedure as CA, then the connection to the SeNB should be released, and reestablishment should be performed with a suitable cell.

However, one potential benefit with Option C2 is the possibility that the UE may keep RRC connection with the SeNB in case the UE experiences RLF with the MeNB. Although the main intention of SeNB's RRC connection is to serve the functionality specific to the SeNB (e.g., RRM for the SeNB and not the MeNB), it may be possible to extend the SeNB's RRC functionality to handle abnormal conditions such as RLF or HOE For example, UE could fall back to the single cell operation with SeNB with a restricted RRC procedure such that the UE will be allowed to send RRC Connection Reestablishment message to the SeNB without going through the typical RA process. As an optional, the SeNB could, in turn, send Reestablishment related messages to the appropriate MeNB.

Proposal 3: If Option C2 is adopted, we should consider whether further enhancements to the reestablishment procedure would be beneficial in case the UE experiences RLF with the MeNB.

Dual-Connectivity Activation

Dual-connectivity activation is another area where there may be potential benefit with Option C2. With Option C1, if the UE is initially camped on a small cell, the small cell will likely need to handover the UE to the MeNB prior to dual-connectivity since the UE should only have RRC connection with the MeNB. One way to avoid the need for the handover from the small cell to the MeNB prior to dual-connectivity is to ensure that the UE always camp on MeNB since only the MeNB will configure dual-connectivity. However, since the small cell has to support legacy UEs, it must be able to support legacy UEs as a standalone cell. So it may be difficult to prevent UEs from camping on small cells. It is FFS whether further enhancements are needed for the Cell Reselection procedure for dual-connectivity capable UEs.

Proposal 4: we should consider whether enhancements are needed for Cell Reselection procedure for dual-connectivity capable UEs.

With Option C2, although the same procedure may be applied as in Option C1, there is the possibility that the small cell could establish the UE's dual-connectivity with the MeNB without first handing over the UE to the MeNB, since the small cell has RRC connection with the UE over the Uu interface. This would simplify the idle mobility procedure since there is no difference whether the UE is initially connected to the MeNB or the SeNB before dual-connectivity is activated. Therefore, we should introduce a procedure that allows the UE to keep RRC connection with one node when UE enter under the dual-connectivity operation in Option C2. Whether such a procedure is feasible or not depends on which entity is allowed to initiate the dual-connectivity. If only the MeNB can configure dual-connectivity, this kind enhancement will not be possible.

Proposal 5: If Option C2 is adopted, we should consider the possibility of allowing the small cell to initiate dual-connectivity with the MeNB.

Potential Drawback with Option C2

One of the main drawbacks with Option C2 is the complexities associated with the need to support two RRC entities in both the UE and the NW. Even if such complexities are manageable, the effectiveness of dual-connectivity for Option C2 should be further evaluated esp. for Scenario 1. As previously mentioned in section 2.1.2, dual-connectivity may be supported for Scenario 1 using Option C1 by defining a mobility anchor for the MeNB. However, it is still unclear whether Option C2 can be as effective in providing dual-connectivity for Scenario 1. If the UE is in the CRE region, it may be possible for the UE to establish and maintain direct RRC connections to both MeNB and SeNB over their respective Uu interfaces. However, as the UE moves toward the center of SeNB, it is unclear how the UE can maintain the RRC connection with the MeNB when only the Uu interface with the SeNB remains It may also be possible for the RRC messages from the MeNB to be sent to the UE via the Uu interface with the SeNB, but that would defeat the purpose of supporting Option C2. Therefore, it is unclear whether Option C2 will have advantages over Option C1 even if the complexities associated with the support of dual RRC are manageable.

Proposal 6: we should consider whether Option C2 can be as effective as Option C1 for supporting dual-connectivity in Scenario 1.

(CA and Dual-Connectivity)

Thus far, CA and dual-connectivity have been discussed separately. We think there is no specific reason to prevent the possibility for the UE to support dual-connectivity and CA simultaneously in Rel-12 or possibly at a future release if necessary. In fact, both features may have very similar procedures. In FIG. 7.1.1.1.1-1 of the latest running TR, it appears both MeNB and SeNB supports F1 and F2 in Scenario 1. So the above scenario should be feasible. Furthermore, many of the existing MeNBs already support multiple frequency bands so CA can be supported. With the addition of small cells at higher frequencies, it is reasonable to expect that operators would consider the support of simultaneous CA and dual-connectivity. And if both features are supported simultaneously, it would be preferable to reuse the CA mechanism to reduce operation complexity. We should also consider the use of an anchor cell for MeNB from a mobility point of view regardless of whether Option C1 or C2 is adopted.

Proposal 7: Regardless of the CP architecture, MeNB should have the responsibility of mobility management when dual-connectivity is activated.

[Additional Statement 3]

Using option C1 as the baseline CP architecture for inter-eNB CA has agreed. One aspect of the inter-eNB CA that needs to be resolved is the handling of RLF conditions. Additional statement will discuss the issues of RLF related to RLM of SeNB, inter-eNB CA activation and RACH failure.

(Discussion)

Both inter-eNB CA and intra-eNB CA have the benefit of increasing user-throughput by allowing the UE to connect simultaneously to multiple cells. It has already been clarified in the SI that both the MeNB and the SeNB can have its own serving cells belonging to MCG and SCG, respectively. To prevent unnecessary complexity for both the UE and the NW it would be preferable for the CP architecture of intra-eNB CA to be reused in inter-eNB CA's CP architecture as much as possible. However, the reuse of the intra-eNB CA procedures should be done with caution to prevent any significant degradation to inter-eNB CA performance. In the RLF discussions below, RLF related issues for inter-eNB CA are discussed in context of the existing procedure for intra-eNB CA.

RLM of the Special Cell Within the SCG

Figure 19:
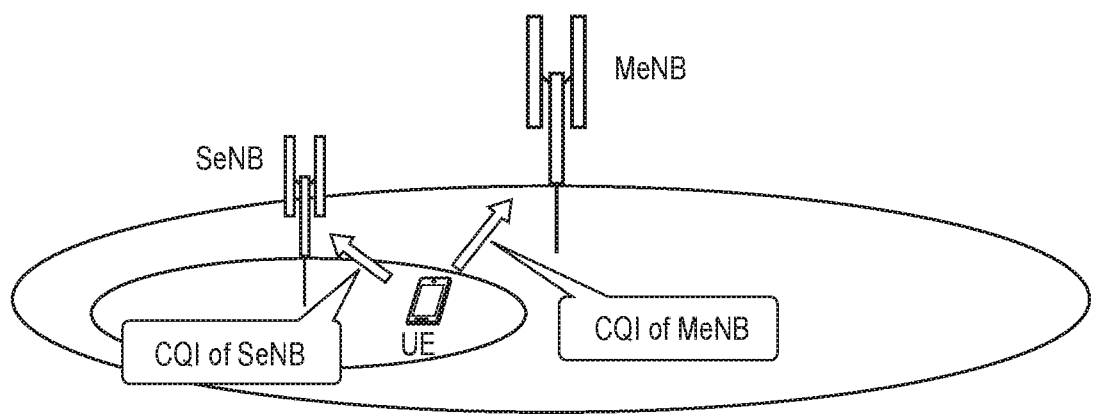
FIG. 19 is a diagram according to an additional statement 3 of embodiments.

In intra-eNB CA, RLM isn't supported on the SCell since PCell uses CQI and measurement reports to determine the status of the SCell, including addition/activation and possible RLF. In inter-eNB CA, the situation isn't as simple, since it is assumed that the SeNB has its own scheduler and the latency in the Xn interface may be excessive, it's reasonable for the UE to send CQI to the MeNB and the SeNB. This concept is described in FIG. 19. In FIG. 19, UE sends each CQI to both MeNB and SeNB. Furthermore, it has already been decided that once dual connectivity is established with an SeNB, a Special Cell will be configured and activated at all times. If RLM is only applied to the MeNB, the UE will not be able to monitor the quality of the Special Cell and trigger the necessary actions. Even if the UE will not trigger RLF as a result of radio link failure with only the Special Cell, it would adversely affect the QoS for the UE if the SeNB is no longer available as part of dual connectivity; therefore, RLM of the Special Cell should be supported. It may be assumed that the RLF with the SeNB will be based only on the Special Cell.

Proposal 1: As a baseline, UE should send CQI to the MeNB and the SeNB.

Proposal 2: UE should also apply RLM to the SeNB.

If Proposal 2 is agreeable, it will also be necessary to determine whether the MeNB needs to know the status of the RLM. As It would be necessary for the MeNB to remove the SeNB as soon as possible to prevent the UE from sending further SRS to the SeNB in case UL transmission to the SeNB is also allowed. Additionally, if the MeNB knows the RLF status of the SeNB, the MeNB could configure the UE with measurement of other candidate inter-frequency SeNBs. Although either SeNB or UE may inform the MeNB of the SeNB's RLF status, in case the backhaul latency is excessive, it may be preferable for the UE to provide the SeNB's RLF status to the MeNB.

Proposal 3: MeNB should be notified of the SeNB's RLF status.

Assuming Proposal 3 is agreed, it is also necessary to determine the form of the notification of the SeNB's RLF status to the MeNB. One possibility would be for the UE or the SeNB to send indication to the MeNB only after the UE has declared RLF with the SeNB. However, it may also be beneficial for the MeNB to obtain the CQI information of the SeNB to better monitor the link to the SeNB since the MeNB is responsible for the addition/removal/switching of the SeNB. Since Alt 3C with bearer split option is already agreed as one of the two UP architectures, it would be up to the MeNB to determine the traffic that would be steered toward the SeNB. Having the CQI of the SeNB would also be beneficial for the MeNB to decide the management of the bearer split.

Proposal 4: As a baseline, UE should send CQI of the SeNB to the MeNB. It is FFS whether additional information from CSI is also needed.

(Inter-eNB CA Activation)

The activation of inter-eNB CA should also be considered based on Option C1. If the UE is initially camped on a small cell, the small cell will likely need to handover the UE to the MeNB prior to inter-eNB CA since the UE should only have RRC connection with the MeNB. One way to avoid the need for the handover from the small cell to the MeNB prior to inter-eNB CA is to ensure that the UE always camp on MeNB since only the MeNB will configure inter-eNB CA. However, since the small cell has to support legacy UEs, it must be able to support legacy UEs as a standalone cell. So it may be difficult to prevent UEs from camping on small cells. It is FFS whether further enhancements are needed for the Cell Reselection procedure for inter-eNB CA capable UEs or if other enhancements are needed in the Connected mode to prevent excessive handovers.

Proposal 5: we should consider whether enhancements are needed for Cell Reselection procedure for inter-eNB CA capable UEs or if other enhancements are needed in the Connected mode to prevent excessive handovers.

(RACH)

Currently for intra-eNB CA, RAR is only sent from the PCell; however, this is based on the ideal backhaul which isn't the case for inter-eNB CA. In inter-eNB CA, if we assume that the UE can transmit to both MeNB and SeNB, then the UE will send a RACH preamble to the SeNB. However, if the UE can only receive RAR from the MeNB, depending on the latency of the Xn interface, this may adversely affect how the network can adequately determine the proper value for the T300 timer. Therefore, it would be better to allow the SeNB to send the RAR to the UE. If the RAR is sent from the MeNB then it is also necessary for the MeNB to know the RACH status, in particular, if the RACH fails since the MeNB is responsible for configuring inter-eNB CA. Then the SeNB or the UE should inform the MeNB of RACH failures.

Proposal 6: When the UE sends RACH preamble to the SeNB, the SeNB should send the RAR to the UE.

Proposal 7: The SeNB or the UE should inform the MeNB of RACH failures.

INDUSTRIAL APPLICABILITY

The present disclosure is useful for mobile communication fields.

The invention claimed is:

1. A master base station for a mobile communication system that supports a dual connectivity, the master base station comprising:
    a controller including a processor and a memory, and configured to establish an RRC (Radio Resource Control) connection with a user terminal, and to perform a mobility control in the dual connectivity, wherein
    the controller receives, from the user terminal, capability information on capability of the dual connectivity of the user terminal, and decides whether to apply the dual connectivity to the user terminal based on the capability information,
    the controller transmits, to a secondary base station, an allocation request requesting an allocation of additional radio resources for the user terminal in response to the master base station deciding to start the dual connectivity, wherein the controller transmits, to the secondary base station, context information on the user terminal and configuration parameters in the master base station,
    the controller receives a response from the secondary base station after a transmission of the allocation request, the response including information on a random access channel to be used by the user terminal to perform a random access to the secondary base station,
    the controller receives, from the secondary base station that allocates additional radio resources to the user terminal during the dual connectivity, a notification indicating a release request requesting a release of the additional radio resources, wherein the controller receives the release request notification in response to the secondary base station ending the dual connectivity based on radio condition between the user terminal and the secondary base station, and
    the controller receives, from the secondary base station, remaining downlink data that has not been acknowledged by the user terminal, in response to the master base station confirming the release of the additional radio resources.

2. A master base station for a mobile communication system that supports a dual connectivity, the master base station comprising:
- a controller including a processor and a memory, and configured to establish an RRC (Radio Resource Control) connection with a user terminal, and to perform a mobility control in the dual connectivity, wherein
- the controller decides a splitting mode of traffic of the user terminal between the master base station and a secondary base station, and notifies the user terminal of the decided splitting mode, in response to starting the dual connectivity or during an execution of the dual connectivity,
- the controller transmits, to the secondary base station, an allocation request requesting an allocation of additional radio resources for the user terminal in response to the master base station deciding to start the dual connectivity, wherein the controller transmits, to the secondary base station, context information on the user terminal and configuration parameters in the master base station,
- the controller receives a response from the secondary base station after a transmission of the allocation request, the response including information on a random access channel to be used by the user terminal to perform a random access to the secondary base station,
- the controller receives, from the secondary base station that allocates additional radio resources to the user terminal during the dual connectivity, a notification indicating a release request requesting a release of the additional radio resources, wherein the controller receives the release request notification in response to the secondary base station ending the dual connectivity based on radio condition between the user terminal and the secondary base station, and
- the controller receives, from the secondary base station, remaining downlink data that has not been acknowledged by the user terminal, in response to the master base station confirming the release of the additional radio resources.

* * * * *